(12) United States Patent
Yoon et al.

(10) Patent No.: US 9,946,861 B2
(45) Date of Patent: Apr. 17, 2018

(54) METHOD FOR PROCESSING FINGERPRINT AND ELECTRONIC DEVICE THEREOF

(71) Applicant: Samsung Electronics Co., Ltd., Gyeonggi-do (KR)

(72) Inventors: Su-Ha Yoon, Seoul (KR); Su-Young Park, Gyeonggi-do (KR); Jin-Gil Yang, Gyeonggi-do (KR); Eui-Chang Jung, Seoul (KR)

(73) Assignee: Samsung Electronics Co., Ltd (KR)

( * ) Notice: Subject to any disclaimer, the term of this patent is extended or adjusted under 35 U.S.C. 154(b) by 15 days.

(21) Appl. No.: 14/616,054

(22) Filed: Feb. 6, 2015

(65) Prior Publication Data

US 2015/0220767 A1     Aug. 6, 2015

(30) Foreign Application Priority Data

Feb. 6, 2014 (KR) ........................ 10-2014-0013636

(51) Int. Cl.
    *G06K 9/00*     (2006.01)
    *G06F 21/32*     (2013.01)

(52) U.S. Cl.
    CPC ......... *G06F 21/32* (2013.01); *G06K 9/00006* (2013.01)

(58) Field of Classification Search
None
See application file for complete search history.

(56) References Cited

U.S. PATENT DOCUMENTS

| | | | |
|---|---|---|---|
| 9,489,127 B2 * | 11/2016 | Kim | G06F 3/041 |
| 2004/0032400 A1 * | 2/2004 | Freeman | G06F 9/4443 |
| | | | 345/173 |
| 2007/0150826 A1 * | 6/2007 | Anzures | G06F 3/017 |
| | | | 715/772 |
| 2007/0177777 A1 * | 8/2007 | Funahashi | G06F 21/32 |
| | | | 382/124 |
| 2010/0024028 A1 * | 1/2010 | Baugher | G06F 21/62 |
| | | | 726/17 |
| 2011/0087970 A1 * | 4/2011 | Swink | H04L 51/32 |
| | | | 715/752 |
| 2011/0102567 A1 | 5/2011 | Erhart | |
| 2011/0145833 A1 * | 6/2011 | De Los Reyes | G06F 3/0488 |
| | | | 718/106 |
| 2011/0176037 A1 | 7/2011 | Benkley, III et al. | |

(Continued)

*Primary Examiner* — Iman K Kholdebarin
(74) *Attorney, Agent, or Firm* — The Farrell Law Firm, P.C.

(57) ABSTRACT

A method of operating an electronic device and the electronic device is provided. The method includes setting a fingerprint detecting area functionally connected to a display; identifying a function corresponding to a gesture of an input means input to the display, and determining whether to perform the function with fingerprint information acquired in the fingerprint detecting area. The electronic device includes a display configured to display at least one content; a memory configured to store at least one fingerprint information acquired in a fingerprint detecting area; the fingerprint detecting area functionally connected to the display; and at least one processor configured to set the fingerprint detecting area, identify a function corresponding to a gesture of an input means input to the display, and determine whether to perform the function with the at least one fingerprint information acquired in the fingerprint detecting area.

18 Claims, 24 Drawing Sheets

(56) References Cited

U.S. PATENT DOCUMENTS

| | | | |
|---|---|---|---|
| 2012/0060123 A1* | 3/2012 | Smith | G06F 3/04883 715/833 |
| 2012/0154311 A1* | 6/2012 | Iijima | G06F 3/04883 345/173 |
| 2012/0182253 A1 | 7/2012 | Brosnan | |
| 2012/0249295 A1* | 10/2012 | Yeung | G06F 3/04883 340/5.54 |
| 2012/0258773 A1* | 10/2012 | Alvarez Rivera | G06F 1/1656 455/556.1 |
| 2013/0129162 A1* | 5/2013 | Cheng | G06F 21/32 382/124 |
| 2013/0181949 A1* | 7/2013 | Setlak | G06F 3/042 345/175 |
| 2013/0308838 A1* | 11/2013 | Westerman | G06K 9/0008 382/125 |
| 2014/0003682 A1* | 1/2014 | Vieta | G06K 9/00013 382/124 |
| 2014/0047525 A1* | 2/2014 | Bonhoff | G06F 21/36 726/7 |
| 2014/0181964 A1* | 6/2014 | Park | G06F 21/6209 726/19 |
| 2014/0283142 A1* | 9/2014 | Shepherd | G06F 3/0482 726/30 |
| 2014/0368444 A1* | 12/2014 | Abzarian | G06F 3/041 345/173 |
| 2015/0074615 A1* | 3/2015 | Han | G06K 9/00033 715/863 |
| 2015/0220767 A1* | 8/2015 | Yoon | G06F 21/32 382/124 |

* cited by examiner

METHOD FOR PROCESSING FINGERPRINT AND ELECTRONIC DEVICE THEREOF

PRIORITY

This application claims priority under 35 U.S.C. § 119(a) of a Korean Patent Application filed on Feb. 6, 2014 in the Korean Intellectual Property Office and assigned Serial No. 10-2014-0013636, the entire contents of which are incorporated herein by reference.

BACKGROUND

1. Field of the Invention

The present invention relates generally to a method of acquiring or processing fingerprint information and an electronic device thereof, and more particularly, to a method of acquiring or processing fingerprint information by setting a fingerprint detecting area and an electronic device thereof.

2. Description of the Related Art

As mobile communication technology develops, electronic devices are provided in various forms such as a smart phone, a wearable device, and a tablet Personal Computer (PC) and may transmit and receive various data via a communication system therebetween. The electronic device may provide various functions such as a phone function, a message function, and an alarm function.

When the electronic device provides a function, the electronic device may be set to provide a selected function upon inputting a designated passcode, where the passcode may be set to input a user's fingerprint information. When a user's fingerprint information is input, the electronic device acquires the fingerprint information of a finger that contacts a fingerprint detecting interface included at a designated location thereof.

The electronic device may include a battery of a designated capacity and provide various functions with a designated capacity of the battery. In an electronic device, in a fingerprint detecting interface interconnected with a display, in an area not used for detecting a fingerprint, power may unnecessarily be consumed.

SUMMARY

The present invention has been made to address at least the above-mentioned problems and/or disadvantages, and to provide at least the advantages described below. Accordingly, an aspect of the present invention is to provide a method for processing fingerprint information and an electronic device thereof.

In accordance with an aspect of the present invention, a method of operating an electronic device is provided. The method includes setting a fingerprint detecting area functionally connected to a display; identifying a function corresponding to a gesture of an input means input to the display, and determining whether to perform the function with fingerprint information acquired in the fingerprint detecting area.

In accordance with another aspect of the present invention, a method of operating an electronic device is provided. The method includes receiving device related information of another electronic device and setting a fingerprint detecting area within a display; detecting a first gesture of crossing the fingerprint detecting area and receiving a second gesture of crossing a display of the another electronic device sequentially performed after the first gesture from the another electronic device; and performing a function corresponding to the first gesture and the second gesture according to fingerprint information detected in a process of crossing the fingerprint detecting area.

In accordance with another aspect of the present invention, a method of operating an electronic device is provided. The method includes receiving device related information of another electronic device and setting a fingerprint detecting area within a display; receiving a first gesture of crossing a display of the another electronic device from the another electronic device and detecting a second gesture of crossing the fingerprint detecting area sequentially performed after the first gesture; and performing a function corresponding to the first gesture and the second gesture according to fingerprint information detected in a process of crossing the fingerprint detecting area.

In accordance with another aspect of the present invention, an electronic device is provided. The electronic device includes a display configured to display at least one contents; a memory configured to store at least one fingerprint information acquired in a fingerprint detecting area; the fingerprint detecting area functionally connected to the display; and at least one processor configured to set the fingerprint detecting area, identify a function corresponding to a gesture of an input means input to the display, and determine whether to perform the function with the at least one fingerprint information acquired in the fingerprint detecting area; and at least one processor that controls the fingerprint processing module.

In accordance with another aspect of the present invention, an electronic device is provided. The electronic device includes a display configured to display at least one contents; a memory configured to store at least one fingerprint information acquired in a fingerprint detecting area; the fingerprint detecting area functionally connected to the display; and at least one processor configured to receive device related information of another electronic device, set the fingerprint detecting area within the display, detect a first gesture of crossing the fingerprint detecting area, receive a second gesture of crossing a display of the another electronic device sequentially performed after the first gesture from the another electronic device, and perform a function corresponding to the first gesture and the second gesture according to the at least one fingerprint information detected in a process of crossing the fingerprint detecting area.

In accordance with another aspect of the present invention, an electronic device is provided. The electronic device includes a display configured to display at least one contents; a memory configured to store at least one fingerprint information acquired in a fingerprint detecting area; the fingerprint detecting area functionally connected to the display; and at least one processor configured to receive device related information of another electronic device, set the fingerprint detecting area within the display, receive a first gesture of crossing a display of the another electronic device from the another electronic device, detect a second gesture of crossing the fingerprint detecting area sequentially performed after the first gesture, and perform a function corresponding to the first gesture and the second gesture according to the at least one fingerprint information detected in a process of crossing the fingerprint detecting area.

BRIEF DESCRIPTION OF THE DRAWINGS

The above and other aspects, features and advantages of the present invention will be more apparent from the following detailed description, taken in conjunction with the accompanying drawings, in which.

DETAILED DESCRIPTION OF EMBODIMENTS OF THE PRESENT INVENTION

Figure 1:
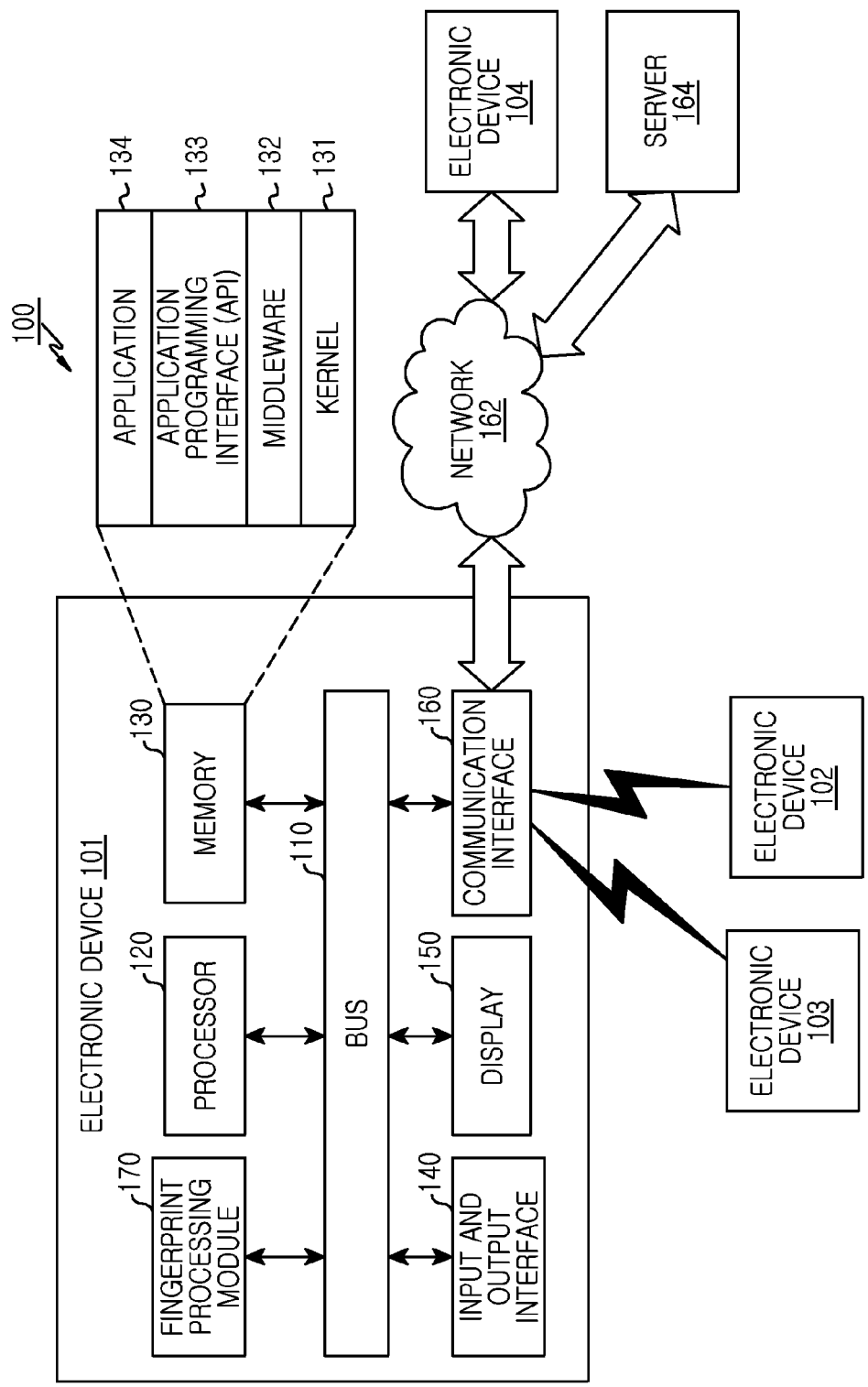
FIG. 1 is a block diagram illustrating a network environment of an electronic device according to an embodiment of the present invention.

Hereinafter, embodiments of the present invention are described in detail with reference to the accompanying drawings.

While the present invention may be embodied in many different forms, certain embodiments of the present invention are shown in the drawings and are described herein in detail, with the understanding that the present invention is not intended to be limited by the embodiments illustrated in the drawings. The same reference numbers are used throughout the drawings to refer to the same or like parts.

In various embodiments of the present invention, the term "or" includes any and every combination of words listed together. For example, "A or B" may include A, B, or A and B.

In various embodiments of the present invention, terms such as "first," "seconds" "primary," or "secondary" may represent various elements of the present invention but do not limit the order and/or the importance of the corresponding elements. Further, the terms may be used for distinguishing one element from another element. When it is described that an element is "connected" or "electrically connected" to another element, the element may be "directly connected" or "directly electrically connected" to the other element or may be "connected" or "electrically connected" to the other element via a third element. However, when it is described that an element is "directly connected" or "directly electrically connected" to another element, no element may appear between the element and the other element.

Further, terms used in various embodiments of the present invention are used for describing an embodiment, but does not limit the embodiments of the present invention. When used in a description of the present invention and the appended claims, a singular expression includes a plural expression unless it is explicitly represented otherwise.

Unless defined otherwise, a term including a technical term and a scientific term used herein has the same meaning as generally understood by a person of ordinary skill in the art. It should be interpreted that a term that is defined in a generally used dictionary has a meaning corresponding with that of a context of related technology and is not to be interpreted as having an ideal or excessively formal meaning unless explicitly defined herein.

An electronic device according to an embodiment of the present invention may include a communication function. For example, an electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a Moving Picture Experts Group Audio Layer 3 (MP3) player, a mobile medical device, a camera, a wearable device (e.g., a Head Mounted Display (HMD) such as electronic glasses, electronic clothing, an electronic bracelet, an electronic necklace, an electronic accessory, an electronic tattoo, or a smart watch), a television, a Digital Video Disc (DVD) player, an audio device, a refrigerator, an air-conditioner, a vacuum cleaner, an oven, a microwave oven, a washing machine, an air cleaner, a set-top box, a television box (e.g., Samsung HomeSync™, Apple TV™, or Google TV™), a game console, an electronic dictionary, an electronic key, a camcorder, a medical device (e.g., a Magnetic Resonance Angiography (MRA) device, a Magnetic Resonance Imaging (MRI) device, a Computed Tomography (CT) device, a scanning machine, and an ultrasonic wave device), a navigation device, a Global Positioning System (GPS) receiver, an Event Data Recorder (EDR), a Flight Data Recorder (FDR), a vehicle infotainment device, an electronic equipment for a ship (e.g., a navigation device for a ship and a gyro compass), avionics, a security device, an industrial or home robot, a portion of furniture or a building/structure, an electronic board, an electronic signature input device, a projector, and various measuring devices (e.g., water supply, electricity, gas, or electric wave measuring device) including a communication function. An electronic device according to various embodiments of the present invention may be at least one combination of the foregoing various devices. Further, it will be apparent to a person of ordinary skill in the art that an electronic device according to various embodiments of the present invention is not limited to the foregoing devices.

Hereinafter, an electronic device according to various embodiments of the present invention is described with reference to the accompanying drawings. The term "user" used in various exemplary embodiments may indicate a person using an electronic device or a device (e.g., artificial intelligence electronic device) using the electronic device.

FIG. 1 is a block diagram illustrating a network environment 100 of an electronic device 101 according to an embodiment of the present invention.

Referring to FIG. 1, the electronic device 101 includes a bus 110, processor 120, a memory 130, an input and output interface 140, a display 150, a communication interface 160, and a fingerprint processing module 170.

The bus 110 is a circuit that connects the foregoing constituent elements and that transfers a communication signal (e.g., a control message) between the foregoing constituent elements.

The processor 120 receives an instruction from the foregoing other constituent elements (e.g., the memory 130, the input and output interface 140, the display 150, the communication interface 160, or the fingerprint processing module 170) via, for example, the bus 110, decodes the received instruction, and performs an operation and data processing according to the decoded instruction.

The memory 130 stores an instruction or data received from the processor 120 or other constituent elements (e.g., the input and output interface 140, the display 150, the communication interface 160, or the fingerprint processing module 170) or generated by the processor 120 or other constituent elements. The memory 130 includes, for example, programming modules such as a kernel 131, middleware 132, an Application (or program) Programming Interface API 133, or an application 134. The foregoing respective programming modules may be formed with software, firmware, hardware, or a combination of at least two thereof.

The kernel 131 controls or manages a system resource (e.g., the bus 110, the processor 120, or the memory 130) used for executing, an operation or a function implemented in the remaining programming modules, for example, the middleware 132, the API 133, or the application 134. Further, the kernel 131 provides an interface that can enable the middleware 132, the API 133, or the application 134 to access an individual constituent element of the electronic device 101 and to control or manage the individual constituent element.

The middleware 132 performs an intermediary function of enabling the API 133 or the application 134 to communicate with the kernel 131 and to provide and receive data. Further, the middleware 132 controls (e.g., schedules or load balances) a work request received from the application 134 using, for example, a method of aligning a priority that can use a system resource (e.g., the bus 110, the processor 120, or the memory 130) of the electronic device 101 to at least one of the applications 134.

The API 133 is an interface that enables the application 134 to control a function provided in the kernel 131 or the middleware 132 and includes, for example, at least one interface or function (e.g., instruction) for file control, window control, image processing, or text control.

The application 134 may be an application related to information exchange between the electronic device 101 and an external electronic device 102 or 104. The application related to information exchange includes, for example, a notification transfer application for transferring specific information to the external electronic device or a device management application for managing the external electronic device. According to an embodiment of the present invention, the application 134 includes an application additionally designated according to an attribute (e.g., a kind of an electronic device) of an external electronic device 102 or 104.

The input and output interface 140 transfers an instruction or data input by a user via a sensor (e.g., an acceleration sensor, a gyro sensor) or an input device (e.g., a keyboard, a touch screen) to the processor 120, the memory 130, the communication interface 160, or the fingerprint processing module 170 via, for example, the bus 110. For example, the input and output interface 140 provides data about a user touch input via a touch screen to the processor 120. Further, the input and output interface 140 outputs an instruction or data received from the processor 120, the memory 130, the communication interface 160, or the fingerprint processing module 170 via, for example, the bus 110, via the output device (e.g., a speaker or a display). For example, the input and output interface 140 outputs whether fingerprint information is acquired from an input means connected to the fingerprint detecting interface of the fingerprint processing module 170 and/or a result of fingerprint data processed via the processor 120 to the user. According to an embodiment of the present invention, when the fingerprint detecting interface of the fingerprint processing module 170 detects an input means or when fingerprint information is acquired from an input means, the input and output interface 140 outputs a vibration of a designated pattern via a vibration motor included in the electronic device 101 or displays designated information in a designated area of the display 150. The input and output interface 140 outputs a processing result of the execution of a designated function or an authentication procedure via fingerprint information acquired by the fingerprint detecting interface of the fingerprint processing module 170 with a vibration of a designated pattern via a vibration motor and displays designated information in a designated area of the display 150.

The display 150 displays various information (e.g., multimedia data or text data) to the user. The display 150 is formed in a touch screen that inputs an instruction by touching or proximity touching an input means in a display. The touch screen includes a touch panel to simultaneously perform an input function and a display function. The touch panel includes a Liquid Crystal Display (LCD) or an Active Matrix Organic Light Emitting Diode (AMOLED) and may be implemented with a flexible, transparent, or wearable method. The touch panel recognizes a touch input with at least one method of a capacitive, resistive, infrared ray, or ultrasonic wave method. The touch panel further includes a controller. When the touch panel is a capacitive touch panel, the touch panel recognizes a proximity touch as well as a direct touch. The proximity touch is expressed with a non-contact touch or hovering. Such a touch panel further includes a tactile layer and provides a haptic reaction to a user. The touch screen may include a hologram device, where the hologram device displays a stereoscopic image in the air using the interference of light. Additionally, the touch screen further includes a control circuit for controlling a touch panel or a hologram device. In the following description, unless explicitly described to the contrary, a touch screen and a touch panel is represented with the display 150.

The communication interface 160 establishes communication between the electronic device 101 and an external device (e.g., the electronic device 102, the electronic device 104, or the server 164). For example, the communication interface 160 supports network communication (e.g., the Internet, a Local Area Network (LAN), a Wide Area Network (WAN), a telecommunication network, a cellular network, a satellite network, or a Plain Old Telephone Service (POTS)), short range communication (e.g., Wireless Fidelity (WiFi), Bluetooth (BT), Near Field Communication (NFC), Infrared Data Association (IrDA), Access network Technology Plus (ANT+)), or wire communication (e.g., Universal Serial Bus (USB), High Definition Multimedia Interface (HDMI), Recommended Standard 232 (RS-232), or POTS). According to an embodiment of the present invention, a protocol (e.g., a short range communication protocol, a network communication protocol, or a wired communication protocol) for communication between the electronic device 101 and an external device is supported in at least one of the API 133 or the middleware 132. The electronic devices 102 and 104 each may be the same (e.g., the same type) as the electronic device 101 or may be different (e.g., different type) from the electronic device 101.

When the display 150 is formed in a touch screen, the electronic device 101 displays a designated area of the display as a fingerprint detecting area of a fingerprint detecting interface interconnected with the display 150. The electronic device 101 may display a fingerprint detecting area in the display and maintain a fingerprint detecting area functionally connected to the display 150 in an active state in a state that is not displayed in the display 150. In the following description, in the electronic device 101, it is described that a fingerprint detecting area set (e.g., activated) to acquire fingerprint information is displayed in the display 150, but the description also describes the display 150 and an activated fingerprint detecting area of the fingerprint detecting interface functionally connected to the display 150 or a location of the activated fingerprint detecting area where the fingerprint detecting area is not always displayed in the display 150. When an input means contacts with at least a portion of a fingerprint detecting area, the electronic device 101 acquires fingerprint information corresponding to a contact area of the input means via the fingerprint detecting area.

The communication interface 160 establishes communication between the electronic device 101 and an external device (e.g., the electronic device 102, the electronic device 104, or the server 164). For example, the communication interface 160 supports communication of a network 162 (e.g., the Internet, a LAN, a WAN, a telecommunication network, a cellular network, a satellite network, POTS, WiFi, BT, NFC, USB, HDMI, or RS-232) such as short range communication and wired communication. According to an embodiment of the present invention, a protocol (e.g., a short range communication protocol, a network communication protocol, or a wired communication protocol) for communication between the electronic device 101 and an external device is supported in at least one of the API 133 or the middleware 132. The electronic devices 102, 103, and 104 each may be the same (e.g., the same type) as the electronic device 101 or may be different (e.g., different type) from the electronic device 101.

The fingerprint processing module 170 processes at least a portion of information acquired from other constituent elements (e.g., the processor 120, the memory 130, the input and output interface 140, or the communication interface 160) and provides the information to the user with various methods. For example, the fingerprint processing module 170 controls at least a partial function of the electronic device 101 so that the electronic device 101 interconnects with another electronic device (e.g., the electronic device 102, the electronic device 104, or the server 164) using the processor 120 or independently of the processor 120.

The fingerprint processing module. 170 acquires fingerprint information input to the electronic device 101 and processes fingerprint information acquired according to a designated method. The fingerprint processing module 170 is connected to at least one fingerprint detecting interface for acquiring fingerprint information or includes a fingerprint detecting interface (or a fingerprint detecting sensor). Acquisition of fingerprint information in the fingerprint processing module 170 is acquisition of a fingerprint input via at least one fingerprint detecting area connected to the fingerprint processing module 170 or the fingerprint detecting interface formed in the fingerprint processing module 170. In the following description, the fingerprint detecting interface and the fingerprint processing module 170 are described separately, but this is done to facilitate understanding, but the fingerprint detecting interface may be included in the fingerprint processing sensor 170. Fingerprint information acquired in the fingerprint detecting interface is processed via the processor 120 or the fingerprint processing module 170. The fingerprint detecting interface of the fingerprint processing module 170 contacts (or touches) a surface of the display 150 (e.g., a touch screen that can input via direct touch or indirect touch) with an input means (e.g., a finger) having a fingerprint, thereby acquiring fingerprint information corresponding to at least a partial area of a contact area. The fingerprint detecting interface of the fingerprint processing module 170 is implemented in an entire area or a designated partial area of a surface of the display 150, and by designating an entire area or a partial area of the fingerprint detecting interface, the fingerprint detecting interface acquires fingerprint information in the designated area. In the following description, at least a designated partial area of the fingerprint detecting interface may include a fingerprint detecting area. In the following description, the phrase "display a fingerprint detecting area" may refer to displaying information about a designated fingerprint detecting area of the fingerprint detecting interface of the electronic device 101 in the display 150. Further, the phrase "display a fingerprint detecting area" may refer to displaying in a state in which a designated fingerprint detecting area of the fingerprint detecting interface is determined or determining a designated fingerprint detecting area of the fingerprint detecting interface and displaying the designated fingerprint detecting area in the display.

The fingerprint processing module 170 sets a fingerprint detecting area, identifies a function corresponding to a gesture of the input means input to the display 150, and determines whether to perform the function with fingerprint information acquired in the fingerprint detecting area.

The fingerprint processing module 170 sets a fingerprint detecting area in the display 150, performs a function corresponding to a gesture in contents displayed in the display 150 according to a gesture of the input means entering the fingerprint detecting area or overlapped with the fingerprint detecting area, acquires fingerprint information of the input means in the fingerprint detecting area, and determines whether to perform the function.

When at least a portion of a contact area of the display 150 and the input means enters a designated area of the fingerprint detecting area, when at least a portion of a contact area of the display 150 and the input means is overlapped with a designated area of the fingerprint detecting area, or when at least a portion of the contact area crosses the fingerprint detecting area, the fingerprint processing module 170 acquires fingerprint information of the input means. The fingerprint processing module 170 selects contents of the display 150 and detects a dragging gesture when a contact is maintained with the display 150. The fingerprint processing module 170 sets or releases a security attribute designated to the contents according to the gesture. The fingerprint processing module 170 also sets or releases a designated security attribute with the acquired fingerprint information. The fingerprint processing module 170 also detects a gesture of displaying (e.g., dragging and displaying from a first area to a second area) the contents from a first area to a second area. The fingerprint processing module 170 also processes a function including at least one of a security attribute, user information, and designated fingerprint information of a first area in selected contents. The fingerprint processing module 170 also processes a function of setting an attribute of a second area to contents displayed in the second area. When the acquired fingerprint information corresponds with an authentication means of a security attribute set to a second area, the fingerprint processing module 170 performs the function. The fingerprint processing module 170 also determines a fingerprint detecting area at a designated location of a boundary of a first area or a boundary of a second area. The fingerprint processing module 170 also determines a designated area of a display of a second electronic device connected to the electronic device 101 by a network communication to a second area.

The fingerprint processing module 170 may receive device related information of another electronic device, set a fingerprint detecting area within the display 150, detect a first gesture of crossing the fingerprint detecting area, receive a second gesture of crossing a display of the another electronic device sequentially performed after the first gesture from the another electronic device, and perform a function corresponding to the first gesture and the second gesture according to fingerprint information detected in a process of crossing the fingerprint detecting area. The fingerprint processing module 170 displays the fingerprint detecting area in the display 150.

The fingerprint processing module 170 may receive device related information of another electronic device, set a fingerprint detecting area within the display 150, receive a first gesture of crossing a display of the another electronic device from the another electronic device, detect a second gesture of crossing the fingerprint detecting area sequentially performed after the first gesture, and perform a function corresponding to the first gesture and the second gesture according to fingerprint information detected in a process of crossing the fingerprint detecting area.

When entering a fingerprint detecting mode, the fingerprint processing module 170 determines at least one second electronic device connected to the electronic device 101 (e.g. a first electronic device), display a fingerprint detecting area in a designated area of the display 150 based on information about a display of the second electronic device received from the second electronic device, select contents displayed in the display 150 of the electronic device 101, acquire information about a second gesture contacting an input means at a designated location of the display of the second electronic device sequentially performed after a first gesture of an input means crossing the fingerprint detecting area, perform a function corresponding to the first gesture and the second gesture, and acquire fingerprint information of the input means in the fingerprint detecting area, thereby determining whether to perform the function.

The fingerprint processing module 170 may transmit selected contents of the electronic device 101 to a second electronic device. The fingerprint processing module 170 includes designated information of the electronic device 101 in the selected contents.

The fingerprint processing module 170 may receive designated fingerprint information from at least one electronic device connected by a network communication and set security of designated data or a designated system of the electronic device 101. In order to access designated data or a designated system in which security is set, the fingerprint processing module 170 requests fingerprint information corresponding to identification information corresponding to a security key of security setting information from another electronic device and accesses the designated data or designated system in which security is set of the electronic device 101 based on fingerprint information received.

According to an embodiment of the present invention, in a method of acquiring fingerprint information of the input means that touches the display 150, when detecting the input means touching the display 150, the electronic device 101 the fingerprint detecting interface (e.g., fingerprint detecting sensor) functionally connected to the display 150 via the fingerprint processing module 170 acquires fingerprint information corresponding to a designated area of the input means contacting the screen of the display 150 from a designated fingerprint detecting area of the fingerprint detecting interface. At least a portion of a screen of the display 150 in which the input means touches may be a fingerprint detecting interface. Unless stated otherwise, in the electronic device 101, an input in which the input means touches the display 150 is defined as inputting fingerprint information of the input means in a fingerprint detecting area of the fingerprint detecting interface. The processor 120 operates the fingerprint processing module 170 and the fingerprint processing module 170. Additional information about the fingerprint processing module 170 is provided with reference to FIGS. 2 to 10 described below.

Figure 2:
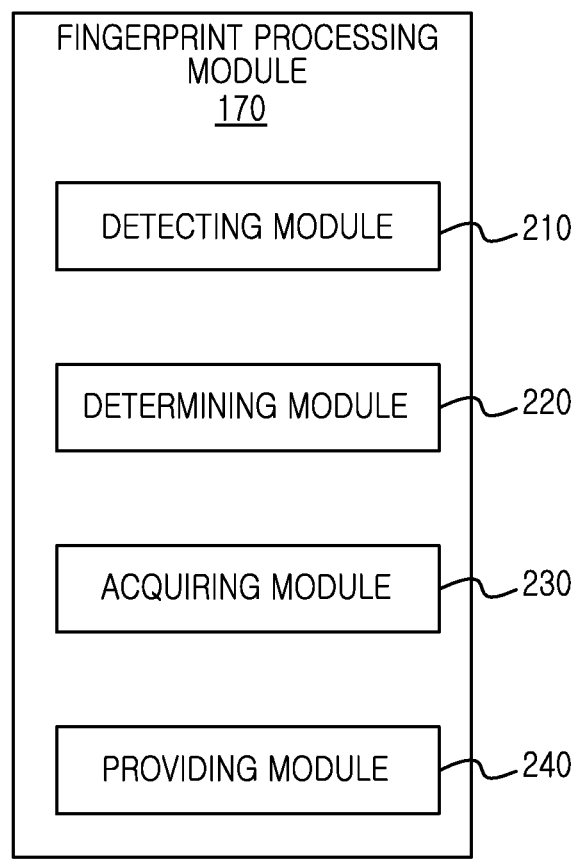
FIG. 2 is a block diagram illustrating a fingerprint processing module of an electronic device according to an embodiment of the present invention.

FIG. 2 is a block diagram illustrating a fingerprint processing module 170 of an electronic device (e.g., the electronic device 101) according to an embodiment of the present invention.

Referring to FIG. 2, the fingerprint processing module 170 includes at least one of a detecting module 210, a determining module 220, an acquiring module 230, and a providing module 240.

The detecting module 210 detects entering a fingerprint detecting mode of the electronic device 101 according to setting information of the electronic device 101. In the electronic device 101, when acquiring fingerprint information, the electronic device 101 acquires fingerprint information of the input means via a fingerprint detecting area operating in a fingerprint detecting mode. When the electronic device 101 operates in a fingerprint detecting mode, the detecting module 210 determines at least one electronic device (e.g., electronic device 102 (e.g. a second electronic device) or electronic device 103 (e.g. a third electronic device)) connected to the electronic device 101 by a network communication. The electronic device 101 receives information about a display of the second electronic device 102 from the second electronic device 102 connected by the network communication or information about a display of the third electronic device 103 from the third electronic device 103 connected by the network communication. According to an embodiment of the present invention, information about the display of the second electronic device 102 received from the second electronic device 102 may include size information (e.g., a horizontal length, a vertical length, and a resolution) of the display, a disposition direction (e.g., a horizontal mode or a vertical mode) of the display, and information about a display device such as screen information while being displayed in the display.

The determining module 220 determines a fingerprint detecting area to use for fingerprint detecting in the fingerprint detecting interface according to setting information of the electronic device 101 and displays the fingerprint detecting area in the display 150. When receiving information about each display of the second electronic device 102 and the third electronic device 103 connected by the network communication, the determining module 220 determines a location and a size of a fingerprint detecting area to use for acquiring fingerprint information with reference to the received information about each display. The determining module 220 determines a location of a contact area in which the input means contacts (or touches) the display 150.

The acquiring module 230 acquires fingerprint information of the input means via a fingerprint detecting area determined in the electronic device 101. When at least a portion of the contact area intrudes upon a fingerprint detecting area that acquires fingerprint information displayed in the display 150, the acquiring module 230 acquires fingerprint information of the input means corresponding to a corresponding contact area. Upon acquiring fingerprint information, when a function of the electronic device 101 corresponding to a gesture input to the display 150 with the input means requests designated fingerprint information, the acquiring module 230 acquires fingerprint information of the input means intruding upon a fingerprint detecting area.

The providing module 240 performs a function of the electronic device 101 corresponding to an input gesture based on fingerprint information of the input means acquired in the fingerprint detecting area. According to an embodiment of the present invention, when contents displayed in the display 150 are selected with the input means and a designated gesture is performed, the providing module 240 performs a function of the electronic device 101 corresponding to the designated gesture in the selected contents.

FIGS. 3A to 3D are diagrams illustrating a method of inputting fingerprint information in an electronic device 101 according to an embodiment of the present invention.

The electronic device 101 processes a fingerprint of the input means contacting a surface of the display 150 via the fingerprint processing module 170. The electronic device 101 activates a fingerprint detecting area corresponding to an entire area or a designated partial area of the surface of the display 150. The electronic device 101 detects that the input means contacts the surface of the display 150. The electronic device 101 activates a designated area from a location at which the input is detected as a fingerprint detecting area and acquires fingerprint information of the input means contacting the activated fingerprint detecting area. Alternatively, the electronic device 101 activates a fingerprint detecting area corresponding to a designated area of the surface of the display 150, and according to an embodiment of the present invention, the electronic device 101 fixes a location of an area in which the fingerprint detecting area is activated. The electronic device 101 acquires fingerprint information when the input means contacts (e.g., touches) a surface of the display 150 corresponding to an area in which a fingerprint detecting area is activated or when the input means moves (e.g., a swipe or a drag) in a contact state. The electronic device 101 changes a location of an area in which a fingerprint detecting area fixed via setting is activated.

Hereinafter, an embodiment of the present invention is described with reference to FIG. 3A.

Figure 3A:
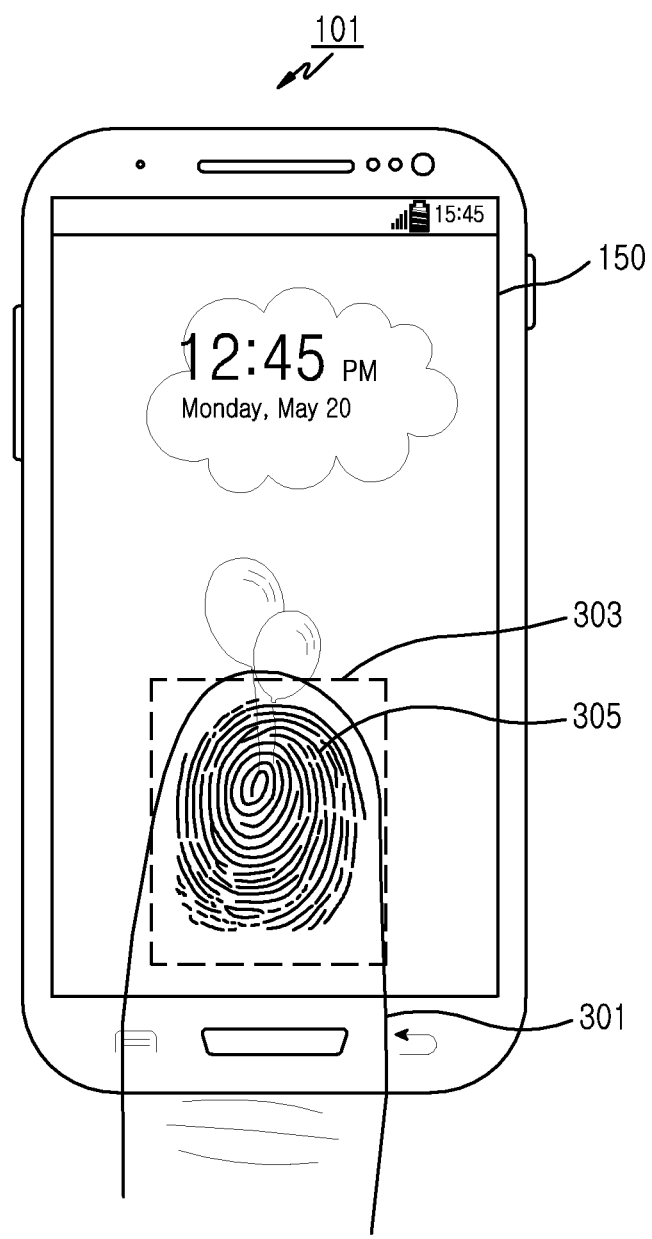
FIGS. 3A, 3B, 3C, and 3D are diagrams illustrating a method of inputting fingerprint information in an electronic device according to various exemplary embodiments of the present invention.

Referring to FIG. 3A, when the electronic device 101 detects a contact of an input means 301 at a partial location of a surface of the display 150, the electronic device 101 activates a fingerprint detecting area at a designated area 303. According to an embodiment of the present invention, when the electronic device 101 detects the input means 301 contacting the display 150, the electronic device 101 determines a designated area 305 based on an area in which the input means contacts. The electronic device 101 activates a fingerprint detecting area corresponding to the designated area 305 of the display 150. The electronic device 101 acquires fingerprint information of the input means 301 contacting the surface of the display 150 via the activated fingerprint detecting area.

The electronic device 101 displays an activated fingerprint detecting area at a corresponding location of the display 150 based on setting information. When an activated fingerprint detecting area is not displayed in the display 150, if the input means contacting the display 150 is detected in at least a portion of the activated fingerprint detecting area, the electronic device 101 displays a designated area corresponding to the activated fingerprint detecting area or at least a partial area in which the input means is detected in the display 150. Alternatively, the electronic device 101 outputs a vibration of a designated pattern using at least one motor included in the electronic device 101 or outputs a designated sound using at least one speaker included in the electronic device 101.

Hereinafter, an exemplary embodiment of the present invention is described with reference to FIG. 3B.

Figure 3B:
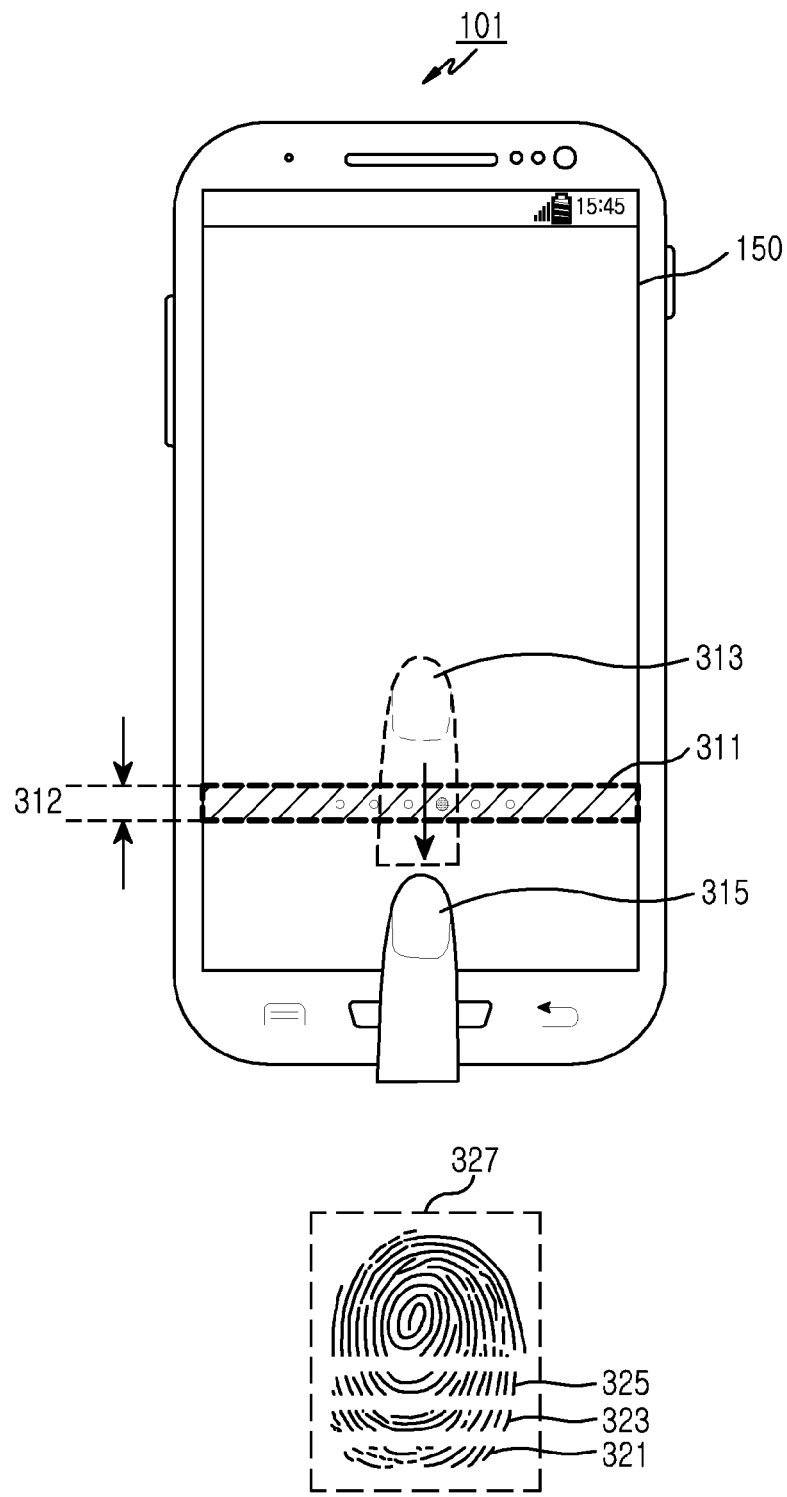

Referring to FIG. 3B, the electronic device 101 designates an area at a designated location of a surface of the display 150 and activates a fingerprint detecting area corresponding to the designated area (e.g., an activated area 311 of a fingerprint detecting area). According to an embodiment of the present invention, the electronic device 101 detects that the input means passes through the designated area 311 of the display 150 corresponding to an activated area of the fingerprint detecting area by moving (e.g., swiping or dragging) the input means while maintaining contact with the display 150.

In a method of acquiring fingerprint information in the electronic device 101, the electronic device 101 follows a form of an activated fingerprint detecting area 311 corresponding to a designated area of a surface of the display 150. For example, when a length 312 of the activated fingerprint detecting area 311 is smaller than a designated length, if the input means passes through the fingerprint detecting area 311 and contacts the surface of the display 150, the electronic device 101 photographs at least some fingerprint information of an area, having contact with the input means. By combining acquired at least one fingerprint information, the electronic device 101 determines fingerprint information of the input means. According to an embodiment of the present invention, the electronic device 101 detects an input means contacting a first location 313 of the surface of the display 150, and the input means may pass through the activated fingerprint detecting area 311 by moving in a direction of a second location 315 while maintaining contact with the surface of the display 150. The electronic device 101 acquires at least one fingerprint information such as first fingerprint information 321, second fingerprint information 323, and third fingerprint information 325 according to a direction and a time sequence in which the input means moves in the activated fingerprint detecting area 311. The electronic device 101 combines the acquired fingerprint information and determines fingerprint information of an input means 327.

The electronic device 101 detects a drag (e.g., touch and move while maintaining the touch) speed of the input means (e.g., a finger) contacting the display 150. When the detected drag speed is faster than a designated speed, the electronic device 101 sets the fingerprint detecting area 311 according to the above-described fingerprint acquiring method and acquires a fingerprint of the input means.

Hereinafter, an embodiment of the present invention is described with reference to FIG. 3C.

The fingerprint detecting interface of the electronic device 101 may be a one-dimensional (e.g., 1D) method of a fingerprint sensor that acquires fingerprint information by swiping the input means and may arrange at least two one-dimensional fingerprint sensors and acquire fingerprint information of an input means touching the at least two one-dimensional fingerprint sensors. Further, the fingerprint detecting interface of the electronic device 101 may be a two-dimensional method of fingerprint sensor that acquires fingerprint information corresponding to a contact area in which the input means touches.

Figure 3C:
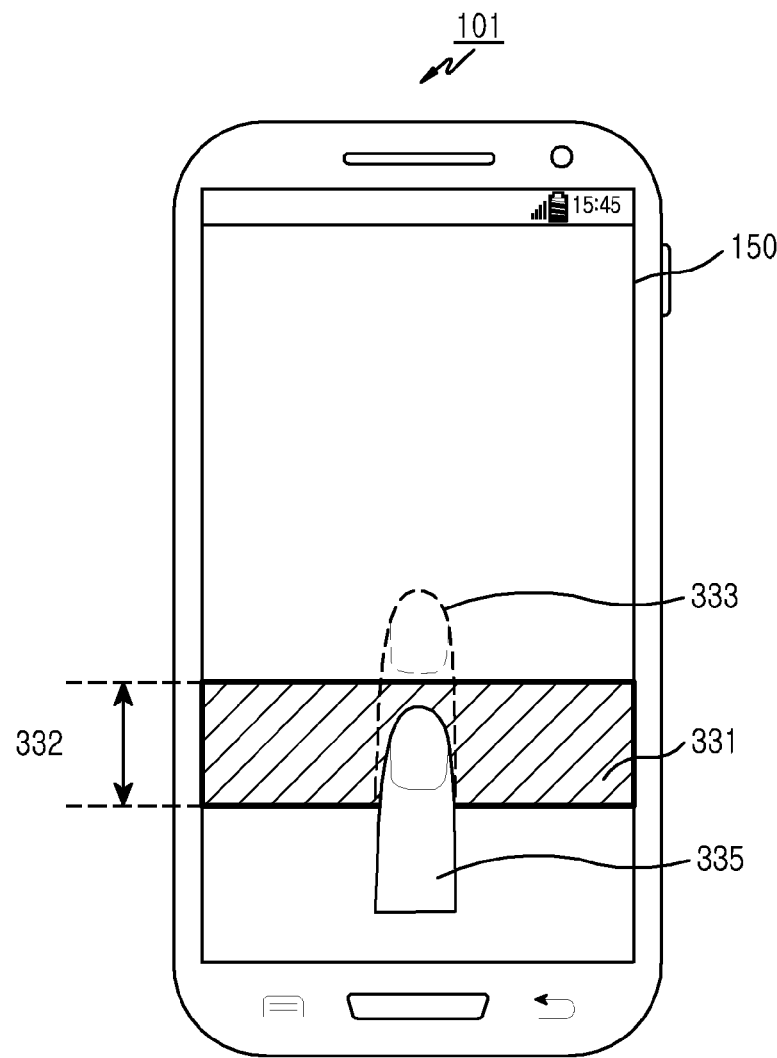
Figure 3C:
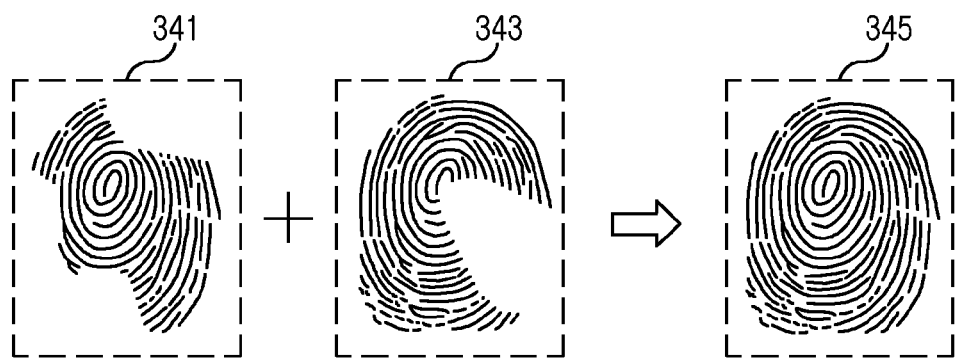

Referring to FIG. 3C, when a length 332 of an activated fingerprint detecting area 331 is longer than a designated length, if the input means passes through the activated fingerprint detecting area 331 while contacting the surface of the display 150, the electronic device 101 determines a state in which a designated area or a designated width is located within the activated fingerprint detecting area 331 based on a contact area of the input means or a width of a contact area. When a designated area or a designated width is located within the activated fingerprint detecting area 331, the electronic device 101 photographs a contact area of the input means contacting the surface of the display 150 and acquires at least partial fingerprint information. When acquiring fingerprint information, the electronic device 101 may acquire fingerprint information at least twice at a designated time interval. For example, the electronic device 101 acquires first fingerprint information 341 by photographing a contact area of the input means located within the activated fingerprint detecting area 331, acquires second fingerprint information 343 by photographing a contact area of the input means located within the fingerprint detecting area 331 after a designated time interval, and acquires third fingerprint information by repeating the above-described method. The electronic device 101 determines fingerprint information 345 of the input means based on at least one of the acquired first fingerprint information 341, second fingerprint information 343, and third fingerprint information (in the case of photographing).

The electronic device 101 detects a drag (e.g., a touch and move while maintaining the touch) speed of the input means (e.g., a finger) contacting the display 150. When the detected drag speed is slower than a designated speed, the electronic device 101 sets a fingerprint detecting area 331 according to the above-described fingerprint acquiring method and acquires a fingerprint of the input means.

Hereinafter, an embodiment of the present invention is described with reference to FIG. 3D.

Figure 3D:
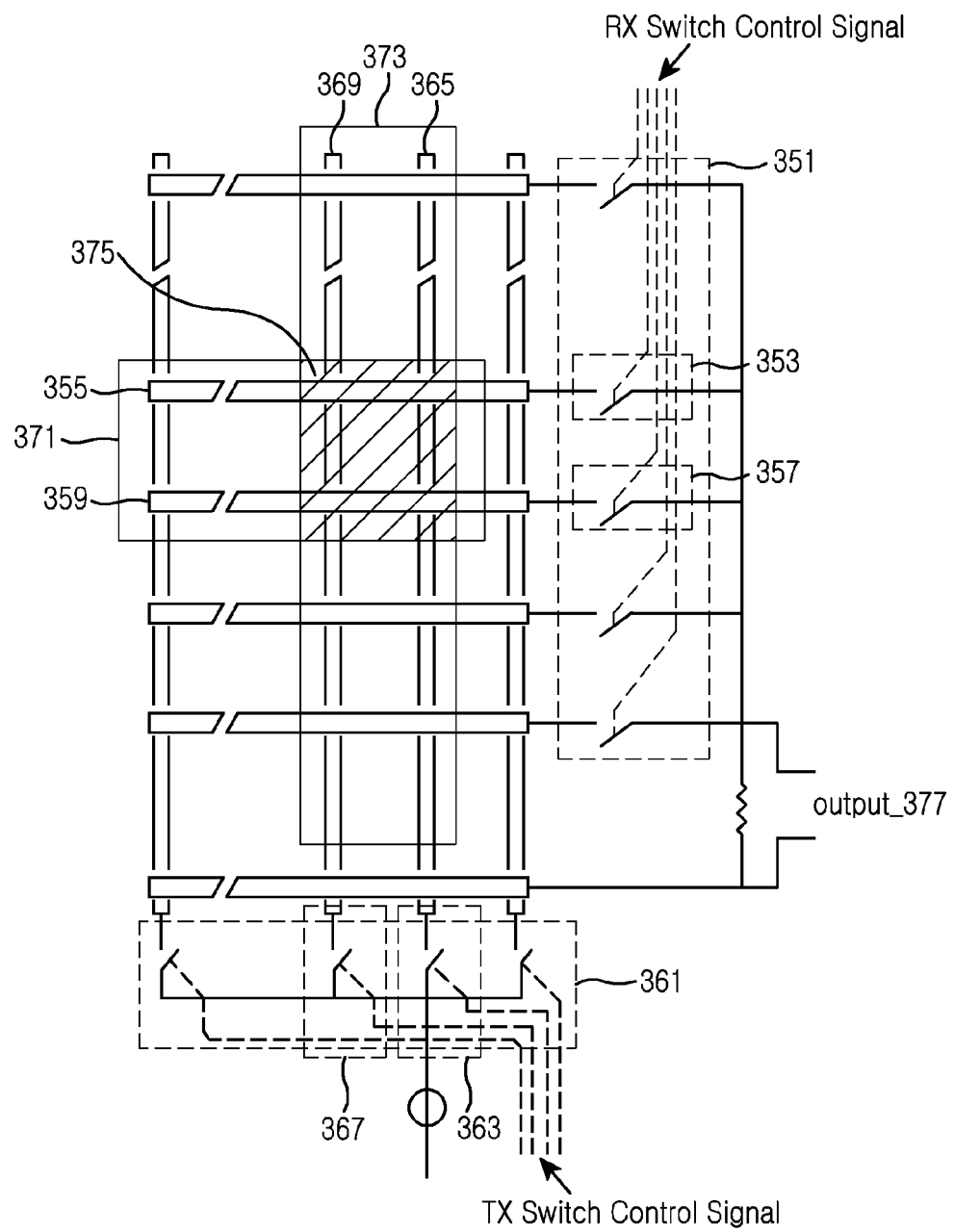

Referring to FIG. 3D, the electronic device 101 acquires an input fingerprint via a partial area of the fingerprint detecting interface. According to an embodiment of the present invention, the electronic device 101 supplies power to a designated partial area of the fingerprint detecting interface and acquires fingerprint information from an activated partial area of the fingerprint detecting interface. According to an embodiment of the present invention, the electronic device 101 processes only fingerprint information input to a designated partial area of the fingerprint detecting interface.

Referring to FIG. 3D, an embodiment of the present invention in which the fingerprint detecting interface that can acquire fingerprint information about an area in which the input means (e.g., a finger) contacts with two-dimensional (2D) information of a designated area or more operates in a designated partial area is described. According to an embodiment of the present invention, the fingerprint detecting interface of the electronic device 101 acquires fingerprint information of the input means input to the fingerprint detecting interface via a signal transmitting and receiving terminal of a horizontal and vertical lattice form, and the fingerprint information is determined via an acquired signal at a crossing location of the signal transmitting and receiving terminal of a lattice form. The fingerprint processing module 170 or the processor 120 of the electronic device 101 transmits a signal or supplies (e.g., activates) power to a designated area (e.g., a Tx area) of the fingerprint detecting interface via a TX signal controller 361 of the fingerprint detecting interface and detects a signal or processes a received signal in a designated area (e.g., an Rx area) of the fingerprint detecting interface via an Rx signal controller 351 of the fingerprint detecting interface.

When acquiring fingerprint information of the input means via a first Tx line 365 of the fingerprint detecting interface, by turning on a switch 363 to transmit a signal or supply power to the first Tx line 365 of the Tx signal controller 361 and by turning on an entire switch (or designating at least one switch) of the Rx signal controller 351, the electronic device 101 acquires fingerprint information of the input means via the activated first Tx line 365.

When acquiring fingerprint information of the input means via the first Rx line 355 of the fingerprint detecting interface, by turning on an entire switch (or designating at least one switch) of the Tx signal controller 361 and by turning on a switch 353 to detect a signal or to process a received signal in the first Rx line 355 of the Rx signal controller 351, the electronic device 101 acquires fingerprint information of the input means via the activated first Rx line 355.

Further, the electronic device 1111 acquires fingerprint information input to a designated partial area 375 (e.g., the fingerprint detecting area 303 of FIG. 3A) of the fingerprint detecting interface. The electronic device 101 turns on the switch 363 to transmit a signal or supply power to the first Tx line 365 of the Tx signal controller 361 and turn on a switch 367 to transmit a signal or supply power to a second Tx line 369 of the Tx signal controller 361. The electronic device 101 turns on the switch 353 to detect a signal or process a received signal in the first Rx line 355 of the Rx signal controller 351 and turn on a switch 357 to detect a signal or process a received signal in a second Rx line 359 of the Rx signal controller 351. By transmitting and receiving a signal and by acquiring the signal with an output line 377 in a crossed area (e.g., an intersection between lines) of an on-area 373 of a Tx area and an on-area 371 of an Rx area, the electronic device 101 acquires fingerprint information of the input means inputting (e.g., contacting) in the designated partial area 375 of the fingerprint detecting interface. The fingerprint detecting interface of the electronic device 101 described in FIG. 3D is a description of a method of processing a signal of a device or physically controlling the supply of power, and it will become apparent that a method of logically processing a signal so as to acquire fingerprint information of the input means in a designated area of the fingerprint detecting interface to correspond to the above-described description may be performed. The electronic device 101 acquires fingerprint information corresponding to a contact area of the input means via a portion of various fingerprint detecting interfaces without being limited to the fingerprint detecting interface described in FIG. 3D. Further, the electronic device 101 acquires fingerprint information of an area in which the input means contacts based on a change of a signal in which the display 150 detects in a touch input contacting the display 150.

FIGS. 4A to 4D are diagrams illustrating a method of processing fingerprint information in an electronic device 101 according to an embodiment of the present invention.

The electronic device 101 acquires a fingerprint of an input means located at an activated fingerprint detecting area (e.g., a fingerprint acquiring area) at a designated location of the display 150. When selecting one content with the input means and inputting a fingerprint of the input means to an activated fingerprint detecting area, the electronic device 101 changes an attribute of the selected one content according to setting information of the electronic device 101.

Hereinafter, an embodiment of the present invention is described with reference to FIG. 4A.

Figure 4A:
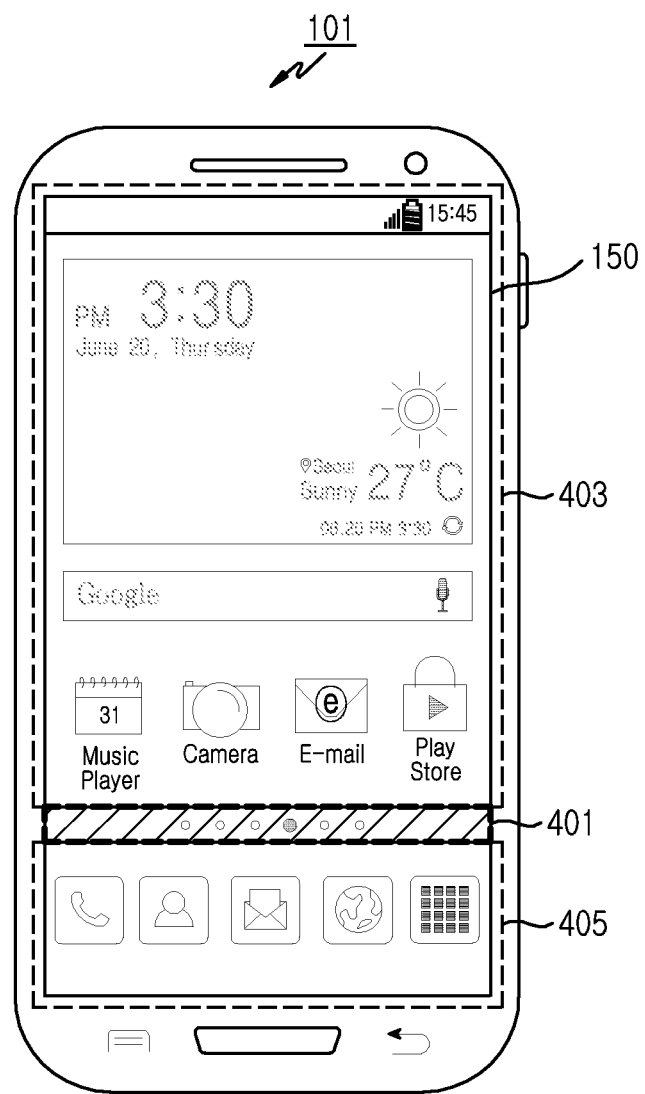
FIGS. 4A, 4B, 4C, and 4D are diagrams illustrating a method of processing fingerprint information in an electronic device according to an embodiment of the present invention.

Referring to FIG. 4A, the electronic device 101 activates a fingerprint detecting area 401 corresponding to a designated area of the display 150. The electronic device 101 visually displays an area of the fingerprint detecting area 401 of an activated state on the display 150. The electronic device 101 acquires fingerprint information of the input means via swiping or dragging in the activated fingerprint detecting area 401 while contacting a designated area of the display 150. The electronic device 101 divides the display 150 into at least two areas (e.g., a first area 403 and a second area 405) and sets a designated attribute to each area. According to an embodiment of the present invention, when operating contents displayed in the first area 403 by applying a first security attribute set to setting information of the electronic device 101 to the first area 403, the electronic device 101 does not perform a security authentication procedure (e.g., a passcode input or a fingerprint input), and when operating contents displayed in the second area 405 by applying a second security attribute set to setting information of the electronic device 101 in the second area 405, the electronic device 101 performs a security authentication procedure.

Hereinafter, an embodiment of the present invention is described with reference to FIG. 4B.

Figure 4B:
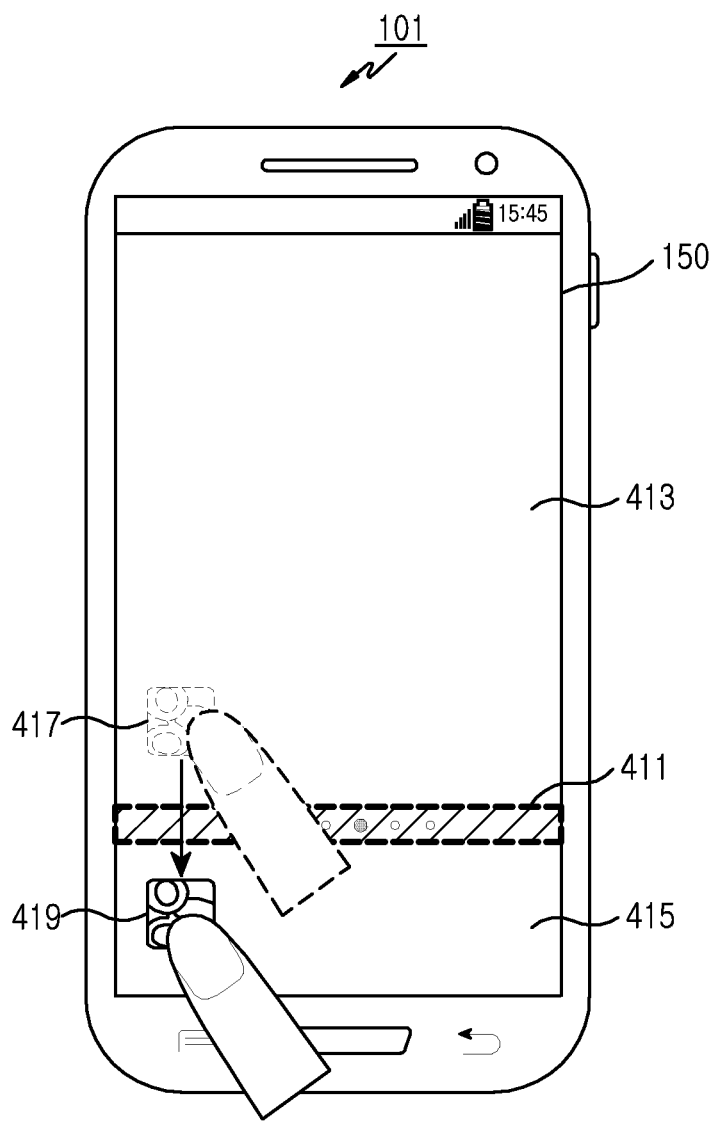

Referring to FIG. 4B, the electronic device 101 sets a designated attribute to each area of a first area 413 and a second area 415 of the display 150 divided based on an activated fingerprint detecting area 411. According to an embodiment of the present invention, when operating contents displayed in the first area 413 by applying a first security attribute set to setting information of the electronic device 101 to the first area 413, the electronic device 101 does not perform a security authentication procedure (e.g., a passcode input or a fingerprint input), and when operating contents displayed in the second area 415 by applying a second security attribute set to setting information of the electronic device 101 to the second area 415, the electronic device 101 performs a security authentication procedure. The electronic device 101 selects (e.g., touches) contents of a first location 417 displayed in the first area 413 of the display 150 with an input means (e.g., an index finger) and moves the input means to a second location 419 of the second area 415 while maintaining the touch. In a process of moving contents selected by the input means from the first area 413 to the second area 415, the electronic device 101 acquires fingerprint information of the input means via the activated fingerprint detecting area 411. In a process of moving selected contents from the first area 413 to the second area 415, the electronic device 101 sets a second security attribute of the second area 415 to contents moved to the second area 415 based on the acquired fingerprint information of the input means. According to an embodiment of the present invention, when calling contents moved to the second location 419 of the second area 415, in a process of moving the selected contents from the first area 413 to the second area 415, the electronic device 101 inputs the acquired fingerprint information.

Hereinafter, an embodiment of the present invention is described with reference to FIG. 4C.

Figure 4C:
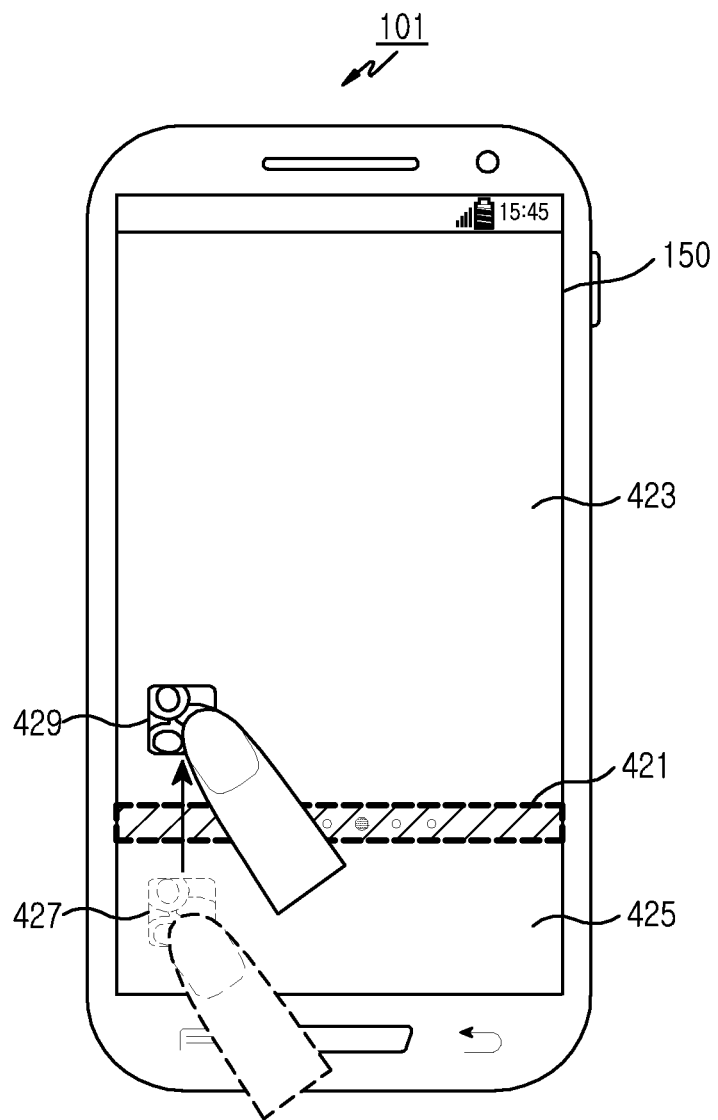

Referring to FIG. 4C, the electronic device 101 sets a designated attribute to each area of a first area 423 and a second area 425 of the display 150 divided based on an activated fingerprint detecting area 421. According to an embodiment of the present invention, the electronic device 101 applies a first security attribute to the first area 423 according to setting information and applies a second security attribute to the second area 425. According to an embodiment of the present invention, the electronic device 101 selects contents of a first location 427 displayed in the second area 425 of the display 150 with the input means (e.g., an index finger). Contents displayed in the second area 425 are contents in which security is set according to a second security attribute, and when performing security authentication, via at least one passcode or fingerprint information, the contents displayed in the second area 425 are executed, called, or moved. While a fingerprint of the input means contacts the surface of the display 150 by selecting contents of the first location 427 to which security is set with a fingerprint of an index finger with the input means (e.g., an index finger), the electronic device 101 moves the selected contents to a second location 429 of the first area 423 by passing through the activated fingerprint detecting area 421 by swiping or dragging. In a process of moving contents selected in the second area 425 to the first area 423, when a fingerprint of the input means is located at a surface of the display 150 corresponding to the activated fingerprint detecting area 421, the electronic device 101 acquires fingerprint information of the input means. When the acquired fingerprint information corresponds with fingerprint information set to security setting information of selected contents at the first location 427 of the second area 425, the electronic device 101 determines to move the selected contents to the second location 429 of the first area 423. When moving contents displayed in the second area 425 to which a second security attribute is set to the first area 423 to which a first security attribute is set, if security is authenticated with acquired fingerprint information according to security setting information of selected contents, the electronic device 101 applies the first security attribute. According to an embodiment of the present invention, at a time point that calls selected contents displayed in the second area 425 according to a second security attribute, in a state of requesting an input of designated fingerprint information (e.g., fingerprint information of an index finger), when movement of the selected contents is determined to the first area 423 to which the first security attribute is applied, at a time point of calling the selected contents, the electronic device 101 changes security setting information to call the selected contents instead of requesting an input of designated fingerprint information (e.g., fingerprint information of an index finger).

Hereinafter, an embodiment of the present invention is described with reference to FIG. 4D.

Figure 4D:
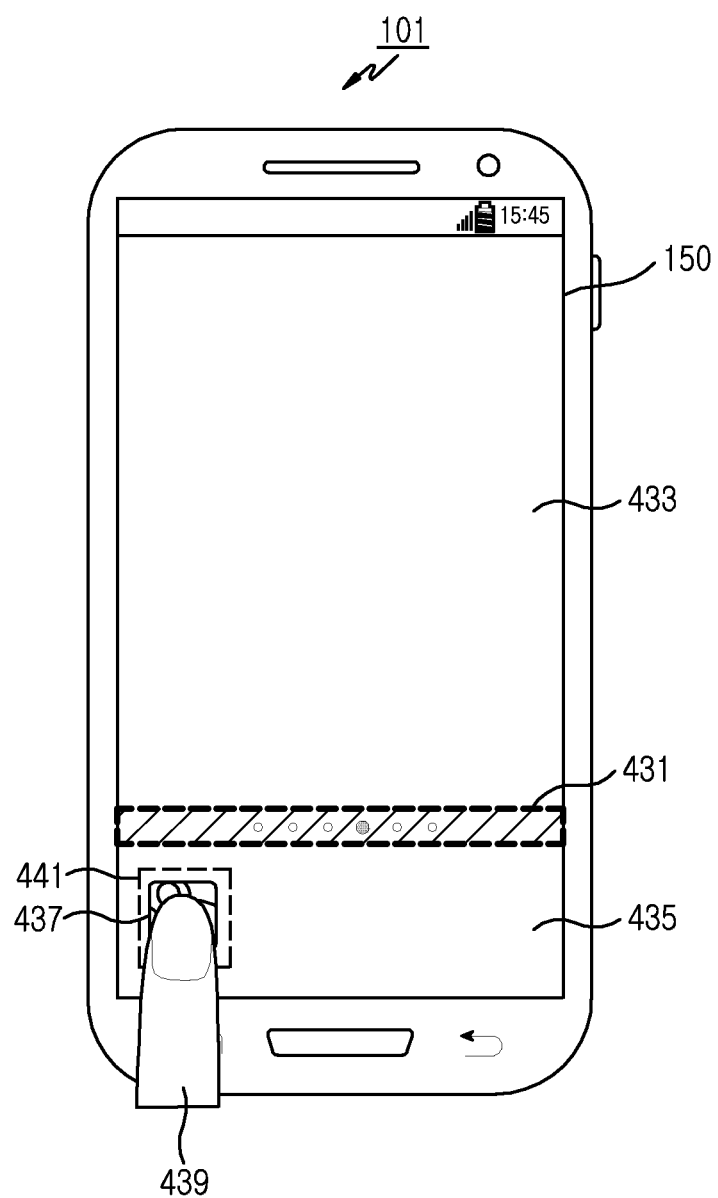

Referring to FIG. 4D, the electronic device 101 determines a second fingerprint detecting area in an area separate from an activated first fingerprint detecting area corresponding to a designated area of the display 150. According to an embodiment of the present invention, the electronic device 101 selects contents 437 of the second area 435. When calling the contents 437 located at the second area 435, the electronic device 101 performs a designated security authentication procedure according to an attribute of the second area 435. According to an embodiment of the present invention, when calling the contents 437 located at the second area 435, if fingerprint information (e.g., fingerprint information of an index finger) stored as setting information of the contents 437 is input, the electronic device 101 calls the contents 437. The electronic device 101 contacts and selects the contents 437 located at the second area 435 of a surface of the display 150 with the input means, and the electronic device 101 maintains a contact state of a designated time (e.g., one second or two seconds) or more. When the input means contacting a designated location of a surface of the display 150 is detected, the electronic device 101 activates a designated second area 441 of a corresponding fingerprint detecting area based on a designated first area that detects a contact of the input means. The electronic device 101 acquires fingerprint information of the input means in the second area 441 of the activated fingerprint detecting area. The electronic device 101 compares the acquired fingerprint information with fingerprint information set to security setting information of the contents 437 via an authentication procedure corresponding to a call of the selected contents 437, and when the acquired fingerprint information corresponds with the fingerprint information set to security setting information of the contents 437, the electronic device 101 calls the selected contents 437.

Figure 5A:
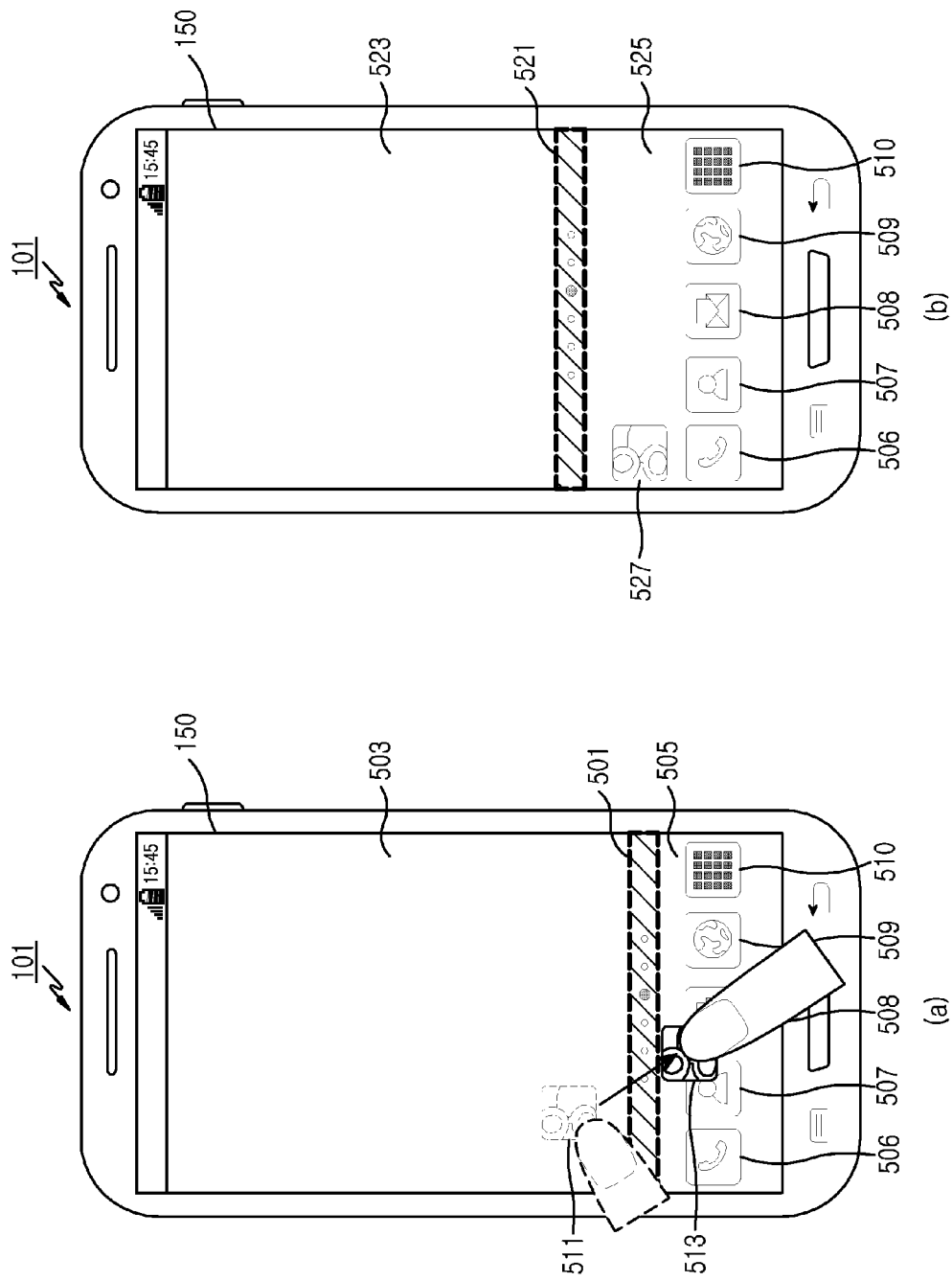
FIGS. 5A, 5B, and 5C are diagrams illustrating a method of using a fingerprint detecting area in an electronic device according to an embodiment of the present invention.
Figure 5B:
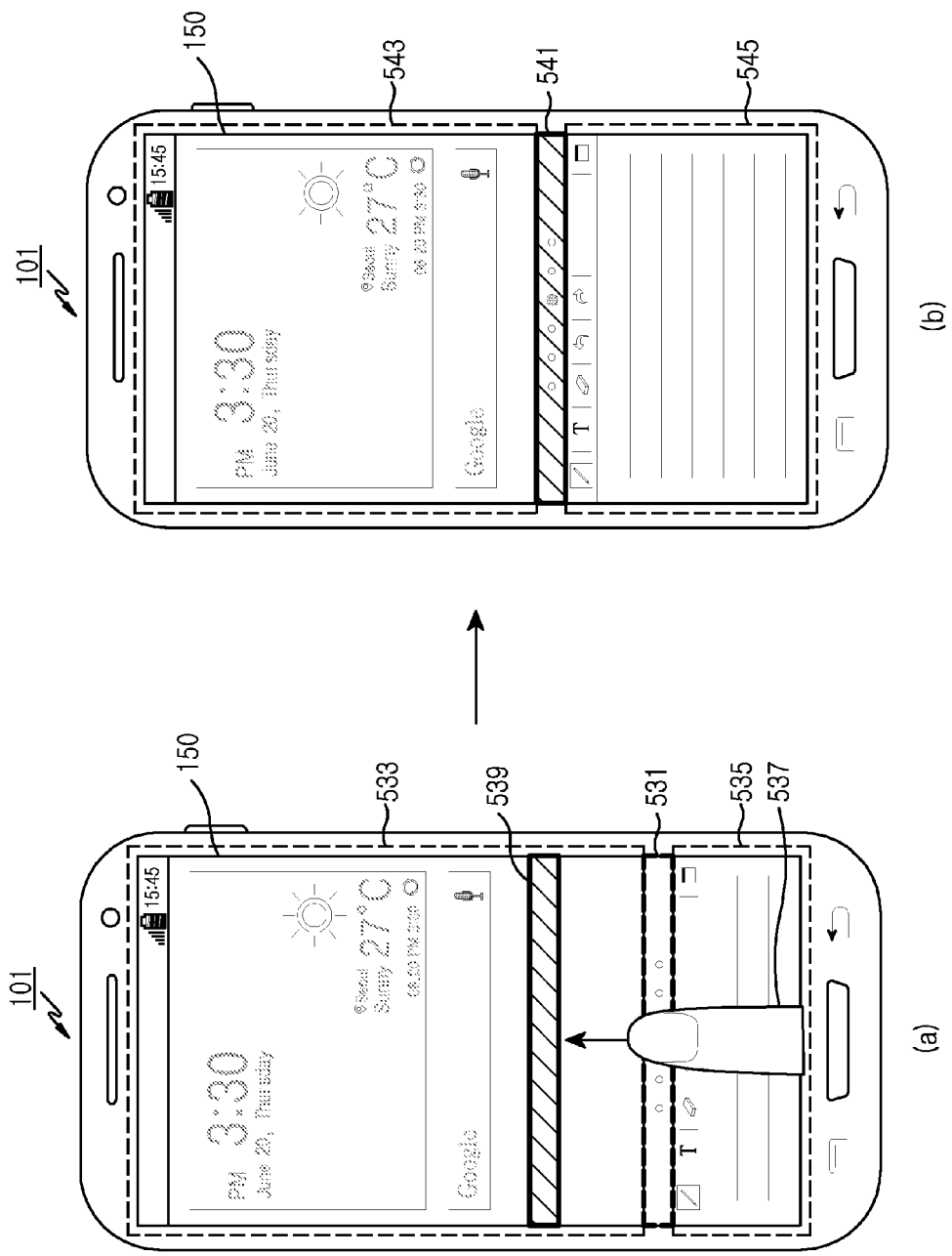
Figure 5C:
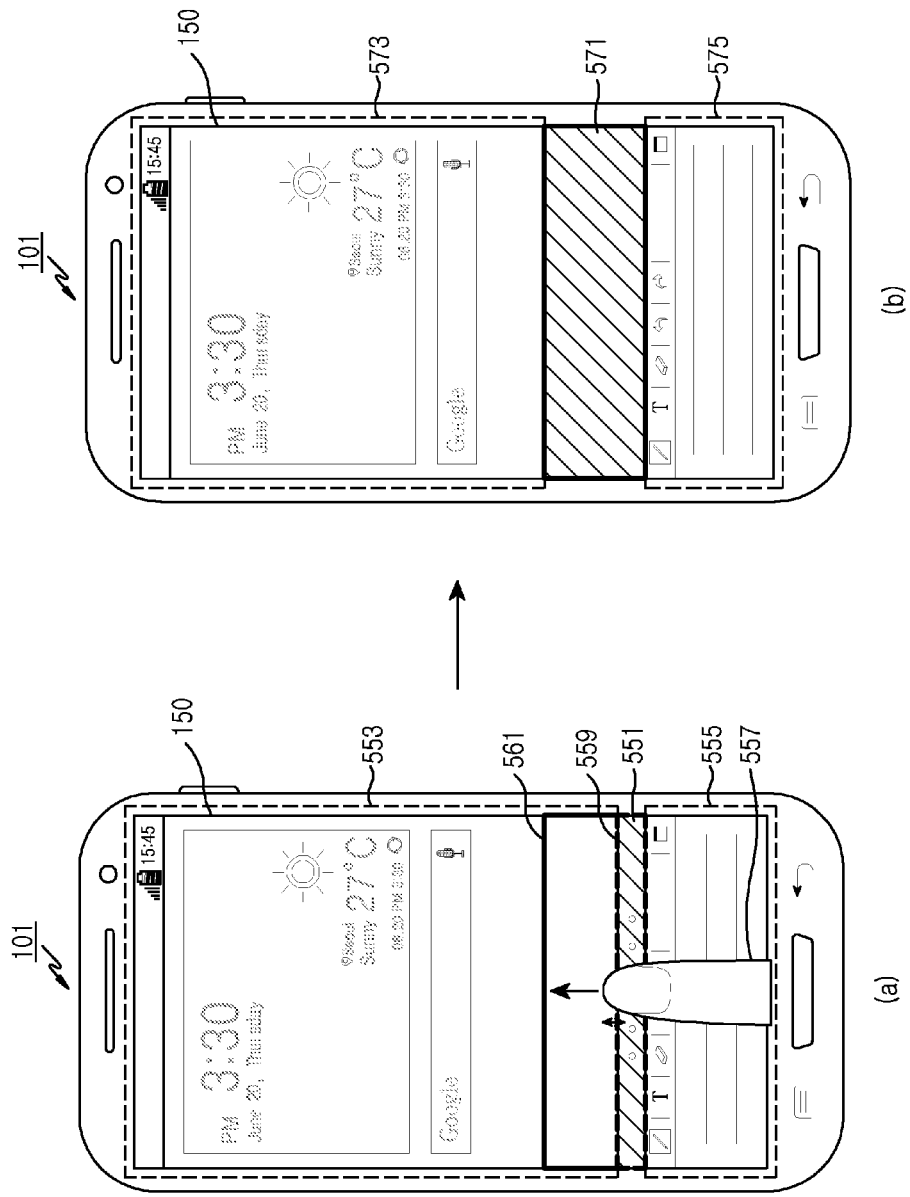

FIGS. 5A to 5C are diagrams illustrating a method of using a fingerprint detecting area in art electronic device 101 according to an embodiment of the present invention.

The electronic device 101 activates a designated area of a fingerprint detecting area formed to interact with a touch (e.g., a direct touch or a proximity touch) of the display 150. According to an embodiment of the present invention, the electronic device 101 changes at least two divided areas according to a location of an activated fingerprint detecting area in the display 150 divided into at least two areas based on the activated fingerprint detecting area. According to an embodiment of the present invention, the electronic device 101 changes a setting area of an activated fingerprint detecting area and/or a setting location of a fingerprint detecting area via a display area of a fingerprint detecting area displayed at a surface of the display 150.

Hereinafter, an embodiment of the present invention is described with reference to FIG. 5A.

Referring to FIG. 5A(a), the electronic device 101 divides the display 150 into at least two areas based on an activated fingerprint detecting area. According to an embodiment of the present invention, the electronic device 101 displays an area corresponding to an activated fingerprint detecting area 501 in a fingerprint detecting area formed to correspond to the display 150 in the display 150. The electronic device 101 divides the display 150 into a first area 503 and a second area 505 based on the fingerprint detecting area 501 displayed in the display 150. When calling contents displayed in the first area 503 of the display 150, the electronic device 101 sets the area to a first security attribute area that calls selected contents without a security authentication procedure such as a passcode input or a fingerprint information input, and when calling contents displayed in the second area 505, the electronic device 101 sets the area to a second security attribute area that requires input of a designated passcode or fingerprint information according to security setting information of the selected contents. The first electronic device 101 detects selecting contents displayed at a first location 511 of the first area 503 and moving the contents to a second location 513 of the second area 505. According to an embodiment of the present invention, in order to select contents displayed at the first location 511 of the first area 503 of the display 150, the electronic device 101 detects an area contacting the first location 511 of the surface of the display 150 with the input means, and in order to move the second location 513, the electronic device 101 detect moving the input means while contacting the surface of the display 150. When an area in which a surface of the display 150 and the input means contact is located at the activated fingerprint detecting area 501, the electronic device 101 acquires fingerprint information of the input means. The electronic device 101 sets a security attribute to moved contents according to a second security attribute of the second area 505 and sets the acquired fingerprint information to fingerprint information used for security authentication of the moved contents.

Referring to FIG. 5A(b), when the electronic device 101 moves selected contents to a second area, space that can display contents may lack in the second area. According to an embodiment of the present invention, the electronic device 101 positions five contents in one line in a second area of the display 150 and positions five contents at a designated location. When moving additional contents to a designated location of the second area, the electronic device 101 changes (e.g., extends) the space of the second area. The electronic device 101 extends the space for positioning contents like a second area 525 displayed in FIG. 5A(b) and displays added contents at a designated location 527 of the extended space. When extending the second area, the electronic device 101 changes a location of the second area 525 or an activated fingerprint detecting area 521 located at a designated area of the second area 525 to a changed second area 525 or a location (e.g., an activated fingerprint detecting area 521) corresponding to a designated area of the changed second area 525.

Hereinafter, an embodiment of the present invention is described with reference to FIG. 5B.

Referring to FIG. 5B(a), the electronic device 101 determines an activated fingerprint detecting area 531 in a designated area of a fingerprint detecting area formed to interact with a touch input of the display 150 and display the activated fingerprint detecting area 531 in the display 150. The electronic device 101 divides the display 150 into at least two areas based on the activated fingerprint detecting area 531. According to an embodiment of the present invention, the electronic device 101 displays information about a first program in a divided first area 533 based on the activated fingerprint detecting area 531 and displays information about a second program in a second area 535. The electronic device 101 changes a location of the activated fingerprint detecting area 531 and changes a form of the first area 533 and the second area 535 according to a location of the changed fingerprint detecting area 531. According to an embodiment of the present invention, the electronic device 101 selects and moves (e.g., drag or swipe) the activated fingerprint detecting area 531 by contacting an input means at a designated location of the activated fingerprint detecting area 531 displayed in the display 150. The electronic device 101 releases the selection of a selected fingerprint detecting area at a designated location of the display 150 and activates a fingerprint detecting area 539 corresponding to a location in which selection of the display 150 is released. The electronic device 101 changes a form of the first area 533 and the second area 535 of FIG. 5B(a) to a first area 543 and a second area 545 of FIG. 5B(b), respectively, according to a location of the changed fingerprint detecting area 539.

Hereinafter, an embodiment of the present invention is described with reference to FIG. 5C.

Referring to FIG. 5C(a), the electronic device 101 determines an activated fingerprint detecting area 551 in a designated area of a fingerprint detecting area formed to interact with an touch input of the display 150 and display the activated fingerprint detecting area 551 in the display 150. The electronic device 101 changes a form of the activated fingerprint detecting area 551 and changes a form of a first area 553 and a second area 555 of the divided display 150 based on the fingerprint detecting area 551 according to a form of the changed fingerprint detecting area 551. According to an embodiment of the present invention, the electronic device 101 enters a mode that can change the activated fingerprint detecting area 551 via a designated gesture or by contacting an input means at a designated location (e.g., a boundary 559 of an activated fingerprint detecting area) of the activated fingerprint detecting area 551 displayed in the display 150. The electronic device 101 changes a form of an activated fingerprint detecting area 551 to a form 561 to correspond to a method of releasing movement and selection while maintaining contact of an input means that selects the boundary 559 of an activated fingerprint detecting area 551 in a mode that can change the fingerprint detecting area 551. The electronic device 101 changes a form of the first area 553 of FIG. 5C(a) to a first area 573 of FIG. 5C(b) according to a location of a changed fingerprint detecting area 571.

Figure 6A:
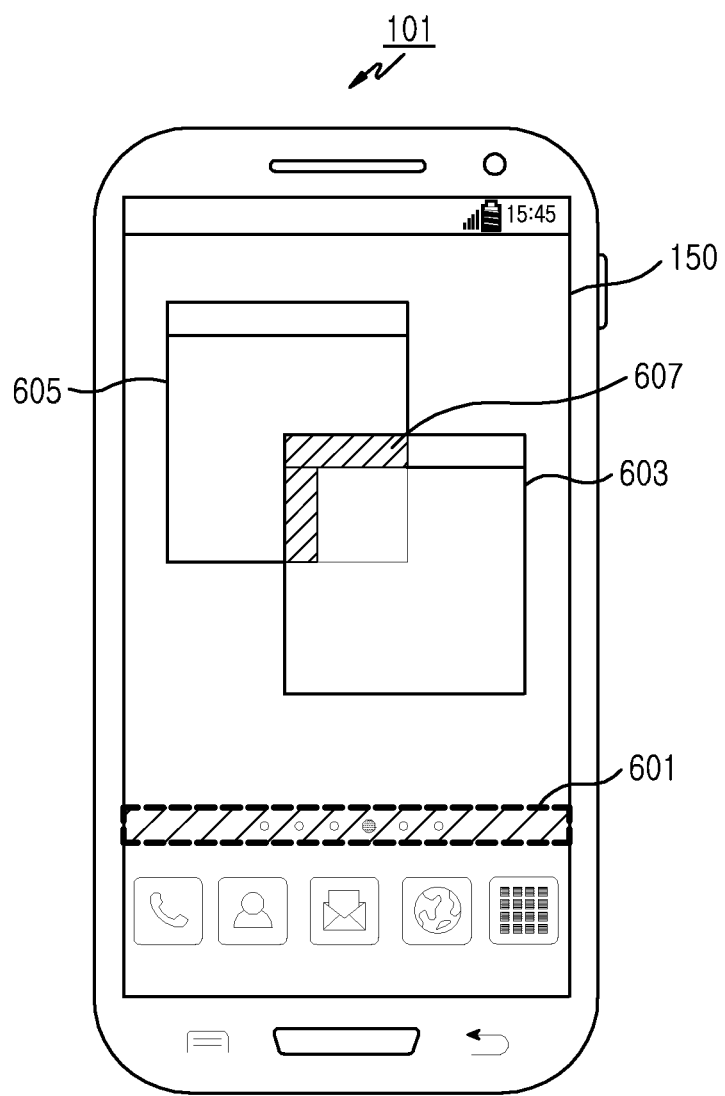
FIGS. 6A and 6B are diagrams illustrating a method of processing fingerprint information in an electronic device according to an embodiment of the present invention.
Figure 6B:
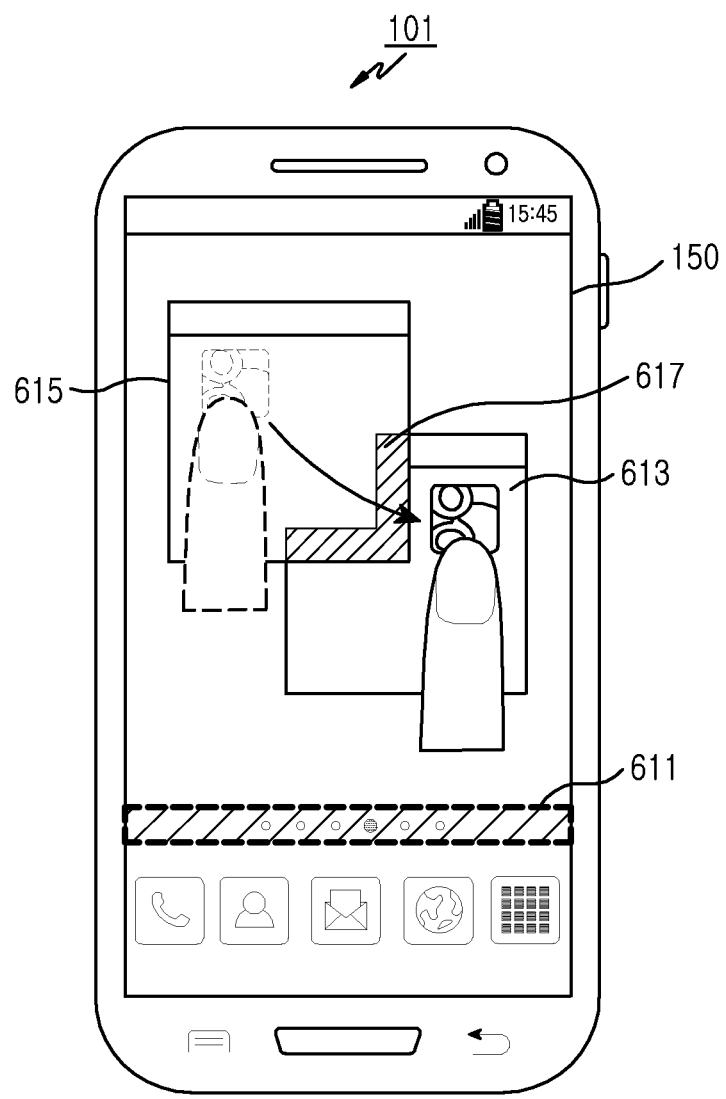

FIGS. 6A and 6B are diagrams illustrating a method of processing fingerprint information in an electronic device 101 according to an embodiment of the present invention.

The electronic device 101 displays an at least one window form in the display 150 and overlaps a designated location of each of the at least one window. For example, at least one window displayed in the display 150 of the electronic device 101 is a group (e.g., a folder) that can include designated contents of the electronic device 101 and is a program operating in the electronic device 101. The electronic device 101 activates a fingerprint detecting area in a designated area of each of the overlapped at least one window. When activating the above-described fingerprint detecting area, the electronic device 101 sets a fingerprint detecting area separately from a previously activated fingerprint detecting area.

Hereinafter, an embodiment of the present invention is described with reference to FIG. 6A.

Referring to FIG. 6A, the electronic device 101 displays a state (e.g., an activated fingerprint detecting area 601) in which a fingerprint detecting area designated to the display 150 is activated and displays a first window 603 and a second window 605 that can display at least one function performing in the electronic device 101. When at least a partial area of the first window 603 and at least a partial area of the second window 605 overlap, the electronic device 101 determines a designated area of a boundary of the overlapped area. According to an embodiment of the present invention, the electronic device 101 activates a fingerprint detecting area 607 corresponding to a designated overlapping area of the first window 603 displayed in a location higher than that of the second window 605 among an overlapped area of the first window 603 and the second window 605 displayed in the display 150. When the electronic device 101 detects that an input means contacts a surface of the display 150 corresponding to the fingerprint detecting area 601 and/or the fingerprint detecting area 607, the electronic device 101 acquires fingerprint information of a corresponding contact area.

Hereinafter, an embodiment of the present invention is described with reference to FIG. 6B.

Referring to FIG. 6B, the electronic device 101 determines an overlapped area of a first window 613 and a second window 615 displayed in the display 150 and activates a fingerprint detecting area 617 corresponding to a designated overlapped area of a second window 615 displayed in a higher location than that of the first window 613 in the overlapped area. The electronic device 101 selects designated contents displayed in the second window 615 with the input means and moves the selected contents to the first window 613. In a process of moving the selected contents, where the input means contacts the surface of the display 150, when the input means is overlapped with an activated area 617 of the fingerprint detecting area corresponding to a designated area of the first window 613 or the second window 615, the electronic device 101 acquires fingerprint information of the input means via the activated fingerprint detecting area 617. When moving selected contents to which an attribute of the second window 615 is applied to the first window 613, if the acquired fingerprint information of the input means is designated fingerprint information that can change a security attribute of the electronic device 101, the electronic device 101 changes an attribute of the selected contents moved to the first window 613 to an attribute of the first window 613.

When moving designated contents displayed in the second window 615 to the first window 613 or vice versa, if fingerprint information is requested in a case of moving contents displayed in an area of at least one of the first window 613 and the second window 615 to other windows (e.g., a third window or a fourth window, except for the first window 613 and the second window 615 or vice versa, when fingerprint information acquired in the designated activated fingerprint detecting area 617 is designated fingerprint information that can change a security attribute of the electronic device 101, the electronic device 101 changes the security thereof, and when fingerprint information acquired in another activated fingerprint detecting area (e.g. a fingerprint detecting area 611) is designated fingerprint information that can change a security attribute of the electronic device 101, the electronic device 101 changes the security thereof.

Figure 7A:
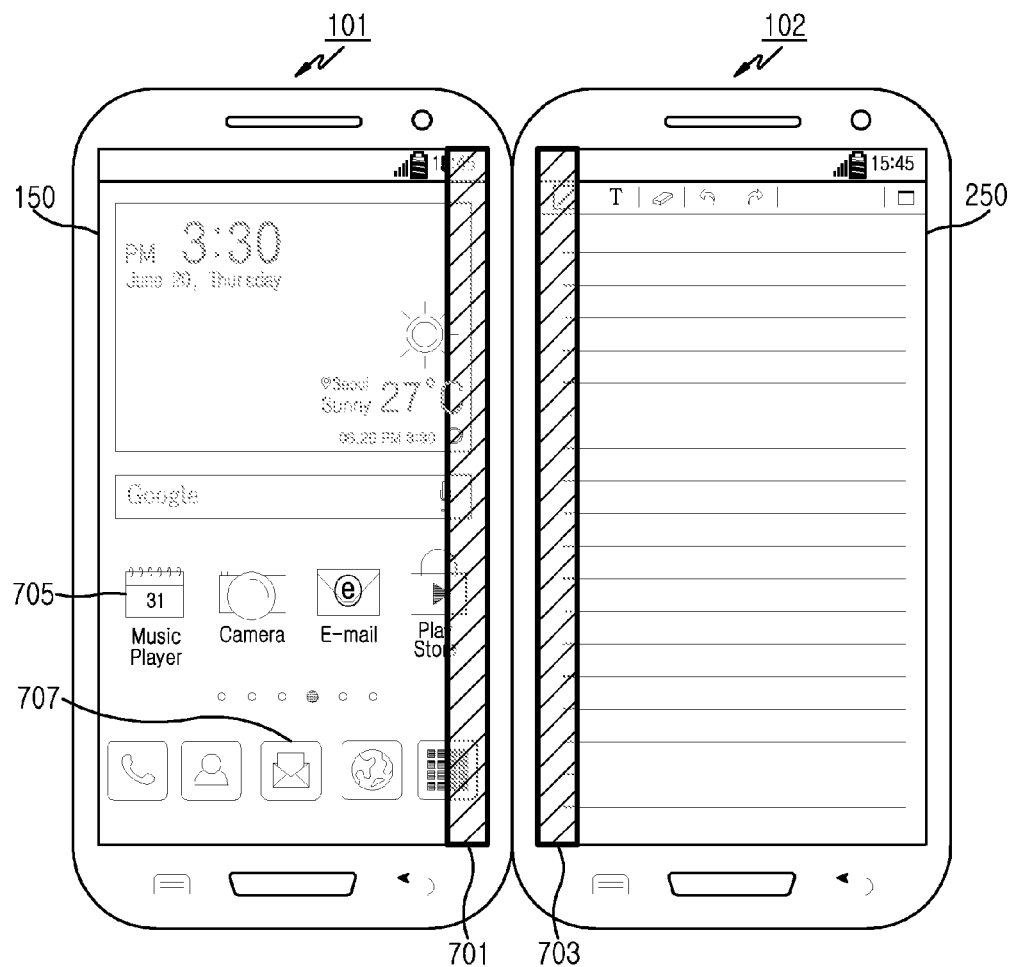
FIGS. 7A, 7B, and 7C are diagrams illustrating a method of determining an activated fingerprint detecting area in an electronic device according to an embodiment of the present invention.
Figure 7B:
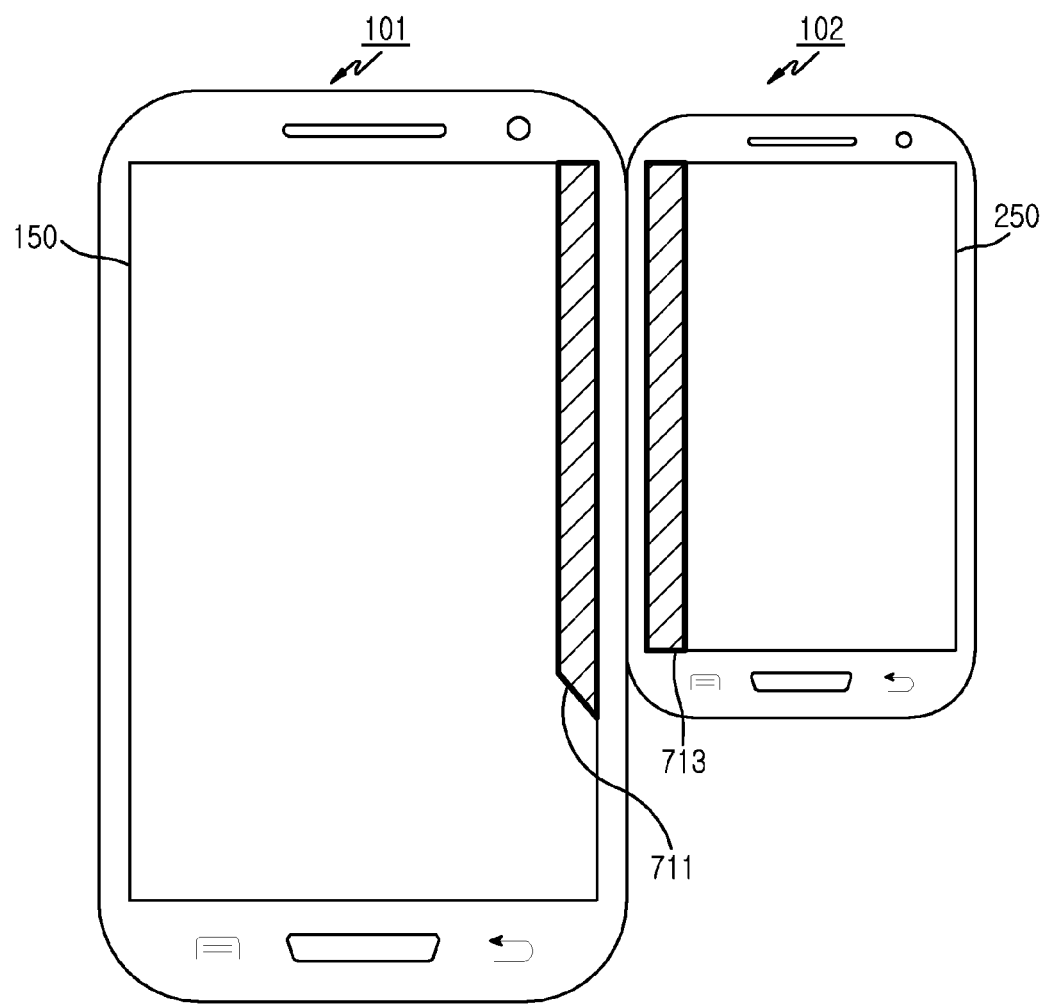
Figure 7C:
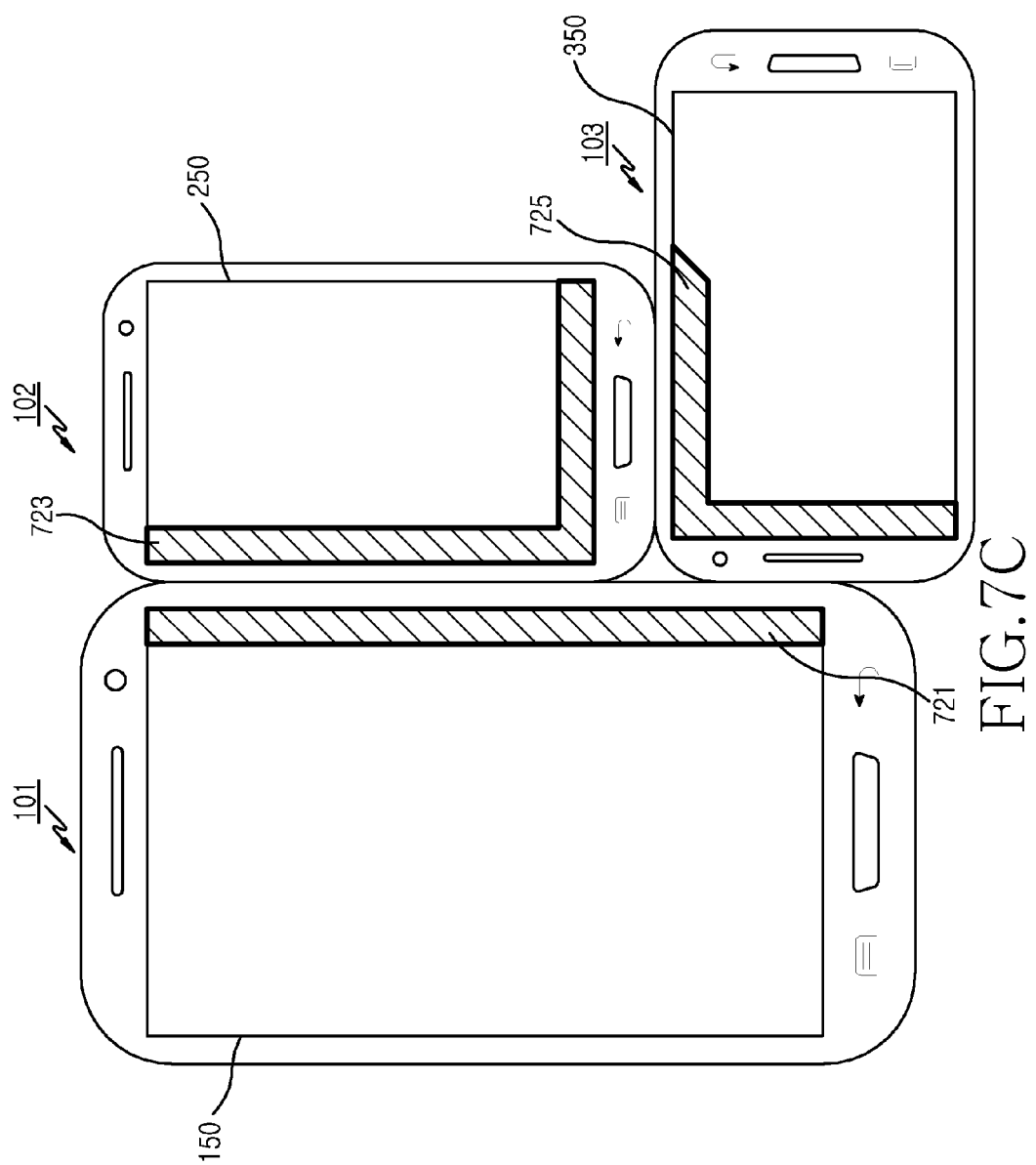

FIGS. 7A to 7C are diagrams illustrating a method of determining an activated fingerprint detecting area in an electronic device 101 according to an embodiment of the present invention.

The electronic device 101 activates a fingerprint detecting area in various forms without being limiting to an activated fingerprint detecting area described with reference to FIGS. 3A to 6B and displays an activated fingerprint detecting area in a designated area of the display 150 corresponding to the activated fingerprint detecting area.

Hereinafter, an embodiment of the present invention is described with reference to FIG. 7A.

Referring to FIG. 7A, the electronic device 101 determines at least one other electronic device (e.g., the electronic device 102) connected thereto by a network communication in a fingerprint detecting mode. The electronic device 101 determines a location of a fingerprint detecting area displayed on a display 150 based on information of the second electronic device 102 received from the second electronic device 102 connected by the network communication or information of the second electronic device 102 set to the electronic device 101. According to an embodiment of the present invention, in a fingerprint detecting mode, the electronic device 101 determines a state connected to the second electronic device 102 by the network communication. The electronic device 101 receives size information (e.g., information about a display device such as a horizontal length, a vertical length, a resolution, and a disposition direction) of a display 250 of the second electronic device 102 from the second electronic device 102 and determines information about a horizontal length, information about a vertical length or information about a disposition direction of the display 250 of the second electronic device 102 or acquires information about the display 250 of the second electronic device 102 in setting information of the electronic device 101. The electronic device 101 determines information about the display 250 of the second electronic device 102 and a fingerprint detecting area 701 designated to the display 150 based on a location (e.g., a location relative to the second electronic device 102) of the first electronic device designated to setting information and/or a direction (e.g., a horizontal mode or a vertical mode). Further, the electronic device 101 determines a location of a fingerprint detecting area to display in the display 250 of the second electronic device 102 with reference to a location of the fingerprint detecting area 701 set to the display 150 and information about the display 250 of the second electronic device 102 and transmits setting information about a corresponding fingerprint detecting area to the second electronic device 102. The second electronic device 102 displays a fingerprint detecting area 703 in the display 250 according to setting information about a fingerprint detecting area received from the electronic device 101. Alternatively, after determining or displaying the fingerprint detecting area 703 in the display 250 of the second electronic device 102, the second electronic device 102 determines or displays the fingerprint detecting area 701 in the display 150 of the electronic device 101.

According to an embodiment of the present invention, the first display 150 of the electronic device 101 and the second display 250 of the second electronic device 102 are in a mode that separates and displays a designated display screen of the electronic device 101. When the first display 150 and the second display 250 are disposed with a designated method, the electronic device 101 controls a display screen to separate and display a designated display screen of the electronic device 101 to each display like one screen. When the electronic device 101 controls (e.g., drag to the second display 250 while crossing a fingerprint detecting area 701 while touching designated contents of the first display 150 with an input means while maintaining the touch) to display designated contents of the first display 150 on the second display 250, the electronic device 101 requests designated fingerprint information according to a security attribute thereof and compares fingerprint information acquired in the fingerprint detecting area 701 with the designated fingerprint information. The electronic device 101 displays selected contents in the second display 250 according to a comparison result.

The electronic device 101 selects contents displayed in the display 150 with the input means and transmits the selected contents to the second electronic device 102 connected by the network communication. According to an embodiment of the present invention, referring to FIG. 7A, the electronic device 101 displays a first fingerprint detecting area 701 thereof at a designated location of the display 150 thereof and displays the second fingerprint detecting area 703 of the second electronic device 102 at a designated location of the display 250 of the second electronic device 102. The electronic device 101 touches and selects contents (e.g., a message 707) displayed in the display 150 thereof with the input means. While the touch of the input means is maintained, the electronic device 101 drags while crossing the first fingerprint detecting area 701 and sequentially inputs drag and touch release operations to a designated location of the display 250 of the second electronic device 102. The electronic device 101 transmits designated information of the selected message 707 to correspond to a gesture input by the input means to the second electronic device 102. When transmitting the selected message 707 to the second electronic device 102, the electronic device 101 requests an input of a designated fingerprint according to setting information of a designated security attribute and acquires fingerprint information in a contact area of the input means crossing the fingerprint detecting area 701 of the display 150. The electronic device 101 compares the acquired fingerprint information with fingerprint information stored as setting information of a security attribute of the electronic device 101 and transmits the selected message 707 to the second electronic device 102 according to a comparison result. When transmitting the message 707 to the second electronic device 102, the electronic device 101 includes designated information (e.g., user information, user profile information and/or information about a security attribute) of the first electronic device 101.

According to an embodiment of the present invention, the electronic device 101 receives information about an input designated gesture (e.g., a first gesture) in the display 250 of the second electronic device 102 and detects an input of a designated gesture (e.g., a second gesture) sequentially performed in the display 150 of the electronic device 101. The electronic device 101 performs a function of the electronic device 101 corresponding to the first gesture and the second gesture, and when performing the above-described function, the electronic device 101 determines whether to perform a function based on fingerprint information of the input means acquired via a fingerprint detecting area set to a designated area of the display 150 and/or fingerprint information included in information about the first gesture acquired from the second electronic device 102. In this case, fingerprint information included in the first gesture acquired from the second electronic device 102 may be fingerprint information of the input means acquired via a fingerprint detecting area set to the display 250 of the second electronic device 102 in a process of inputting the second gesture on the display 250 of the second electronic device 102. Further, when transmitting information about the first gesture to the electronic device 101, the second electronic device 102 includes and transmits attribute information of contents displayed on the display 250 of the second electronic device 102. According to an embodiment of the present invention, when a designated function based on the first gesture and the second gesture is an operation of selecting and copying contents displayed on the display 250 of the second electronic device 102 and displaying contents on the display 150 of the second electronic device 102, the electronic device 101 determines whether to display the above-described contents on the display 150 based on fingerprint information received from the second electronic device 102 and/or fingerprint information acquired in a process of detecting the second gesture.

Hereinafter, an embodiment of the present invention is described with reference to FIG. 7B.

Referring to FIG. 7B, in a fingerprint detecting mode, the electronic device 101 receives information about the display 250 received from the second electronic device 102 connected by a network communication. The electronic device 101 determines a fingerprint detecting area displayed on the display 150 of the electronic device 101 based on information about the display 250 of the second electronic device 102 received from the second electronic device 102 or information about the display 250 of the second electronic device 102 stored as setting information of the electronic device 101. According to an embodiment of the present invention, the electronic device 101 acquires a vertical length of the display 250 of the second electronic device 102 and determines a fingerprint detecting area 711 on the display 150 of the electronic device 101 based on the acquired vertical length.

Hereinafter, an embodiment of the present invention is described with reference to FIG. 7C.

Referring to FIG. 7C, in a fingerprint detecting mode, the electronic device 101 determines a state connected to the second electronic device 102 and the third electronic device 103 by a network communication. The electronic device 101 receives information about the display 250 of the second electronic device 102 from the second electronic device 102 and receives information about a display 350 of the third electronic device 103 from the third electronic device 103. The electronic device 101 determines a fingerprint detecting area of each electronic device (e.g., the first the electronic device 101, the second electronic device 102, and the third electronic device 103) with reference to horizontal length information, vertical length information, and direction information of the display 150, horizontal length information, vertical length information, and direction information of the display 250 received from the second electronic device 102, and horizontal length information, vertical length information, and direction information of the display 350 received from the third electronic device 103 and transmits information to set (or information requesting to set) a fingerprint detecting area 723 to the display 250 of the second electronic device 102 and information (or information requesting) to set a fingerprint detecting area 725 to the display 350 of the third electronic device 103. According to an embodiment of the present invention, the electronic device 101 determines a fingerprint detecting area 721 displayed in the display 150 thereof, the fingerprint detecting area 723 displayed in the display 250 of the second electronic device 102, and the fingerprint detecting area 725 displayed in the display 350 of the third electronic device 103 based on a state in which each electronic device 101, 102, and 103 is located and a distance between the displays (e.g., the display 150, the display 250, and the display 350).

Figure 8A:
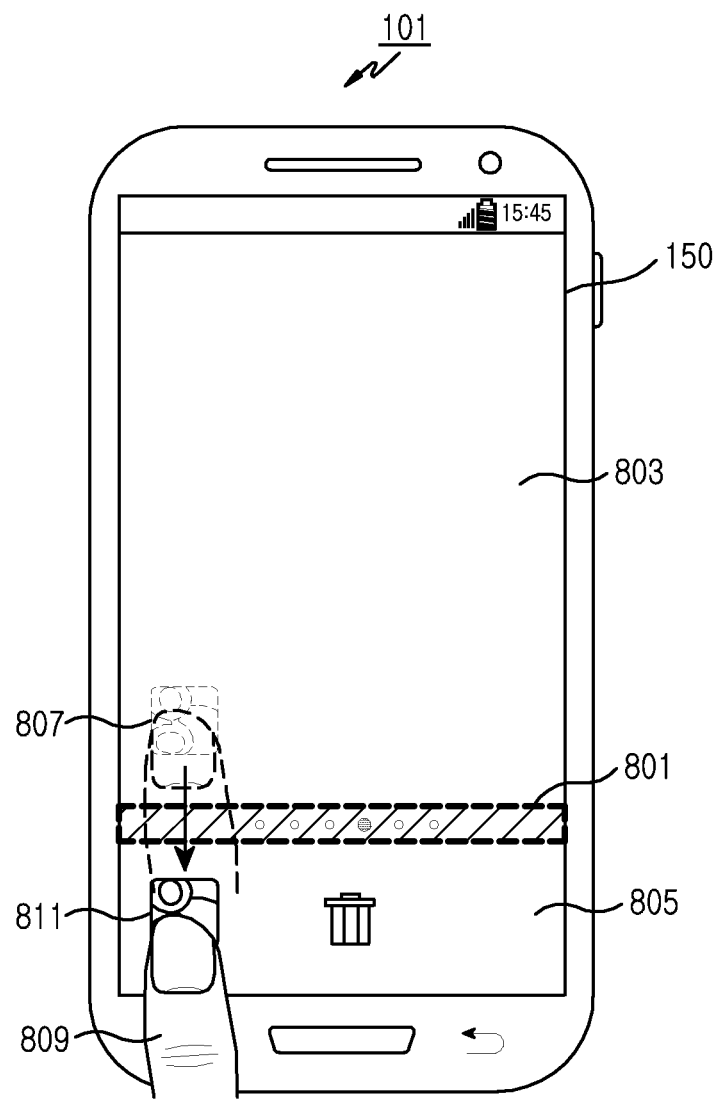
FIGS. 8A and 8B are diagrams illustrating a method of performing a designated function using fingerprint information in an electronic device according to an embodiment of the present invention.
Figure 8B:
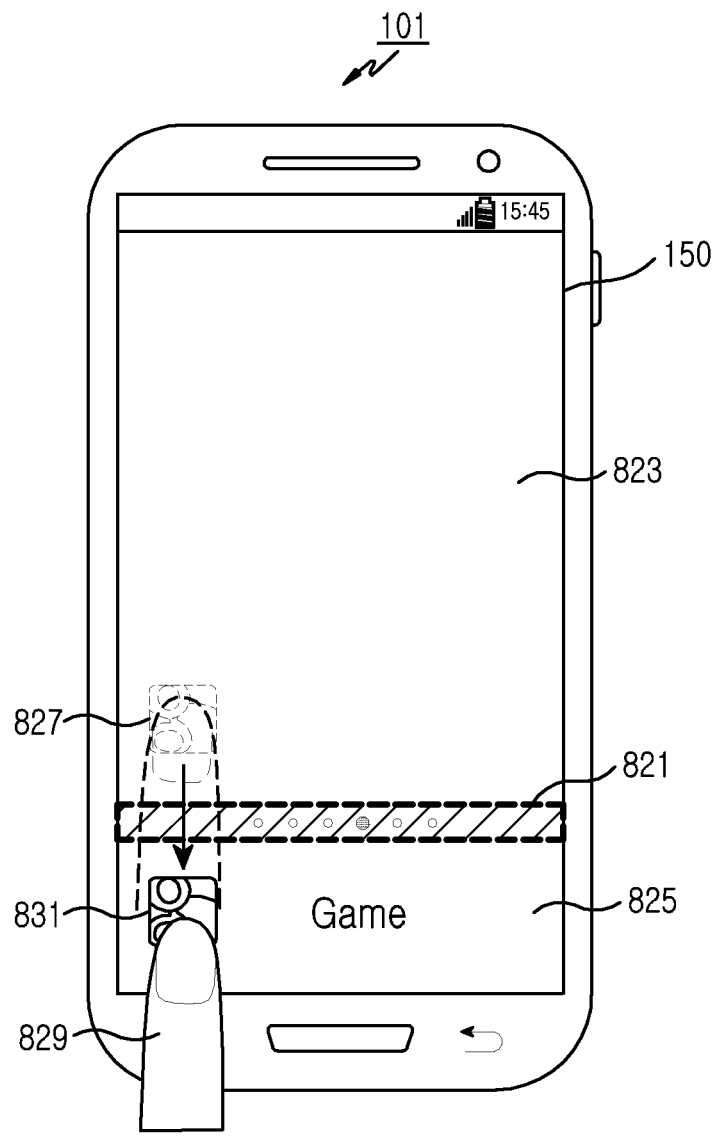

FIGS. 8A and 8B are diagrams illustrating a method of performing a designated function via fingerprint information in an electronic device 101 according to an embodiment of the present invention.

The electronic device 101 performs a function corresponding to fingerprint information acquired in a fingerprint detecting area for designated contents. The electronic device 101 sets a designated area attribute of the display 150 to correspond to fingerprint information acquired in a fingerprint detecting area according to an attribute set to setting information of the electronic device 101.

Hereinafter, an embodiment of the present invention is described with reference to FIG. 8A.

Referring to FIG. 8A, the electronic device 101 changes an area attribute of a designated area of the display 150 according to fingerprint information of the input means acquired in a fingerprint detecting area. According to an embodiment of the present invention, the electronic device 101 sets (and displays) a fingerprint detecting area at a designated location of the display 150. The electronic device 101 sets a designated attribute at the designated area of the display 150 based on a fingerprint detecting area with reference to setting information of the electronic device 101. For example, the electronic device 101 detects a gesture of selecting 807 contents displayed in a first area 803 of the display 150 with the input means and displaying 811 the contents in a second area 805. The electronic device 101 detects a gesture in which a contact area of the input means crosses (or intrudes) a fingerprint detecting area in an operation of moving the selected contents and acquires fingerprint information of the input means via a fingerprint detecting area. The electronic device 101 sets a function (e.g., an attribute) of the electronic device 101 set to correspond to the acquired fingerprint information to the designated second area 805 of the display 150. According to an embodiment of the present invention, when fingerprint information of the input means acquired in a fingerprint detecting area is first fingerprint information that sets fingerprint information of a right thumb 809 of the user, the electronic device 101 sets an area attribute of the designated second area 805 of the display 150 to a recycle bin and deletes contents moved to the second area 805.

Hereinafter, an embodiment of the present invention is described with reference to FIG. 8B.

Referring to FIG. 8B, the electronic device 101 detects a gesture of selecting 827 contents displayed in a first area 823 of the display 150 with the input means and moving 831 the contents to a second area 825. The electronic device 101 acquires fingerprint information of the input means in a fingerprint detecting area. The electronic device 101 displays a designated folder of the electronic device 101 set to correspond to the acquired fingerprint information. According to an embodiment of the present invention, when fingerprint information of the input means acquired in a fingerprint detecting area is second fingerprint information that sets fingerprint information of a right index finger 829 of the user, the electronic device 101 displays a designated game folder of the electronic device 101 in the designated second area 825 of the display 150. When the selection of selected contents is released in the second area 825 in which a game folder is displayed, the electronic device WI moves the selected contents to a corresponding game folder of the electronic device 101.

According to an embodiment of the present invention, the electronic device 101 inputs various input means in setting information and set information such as a function of the electronic device 101 corresponding to at least one fingerprint information or a designated address or attribute at the memory 130 of the electronic device 101. The electronic device 101 displays setting information corresponding to fingerprint information acquired in a fingerprint detecting area in a designated area of the display 150. Fingerprint information in which the electronic device 101 can acquire in a fingerprint detecting area is not limited to fingerprint information such as a user finger or toe and may be information acquired from various input devices that can detect in the fingerprint detecting interface or the display 150 of the electronic device 101 like designated pattern information formed at a contact surface of an electronic pen.

Figure 9A:
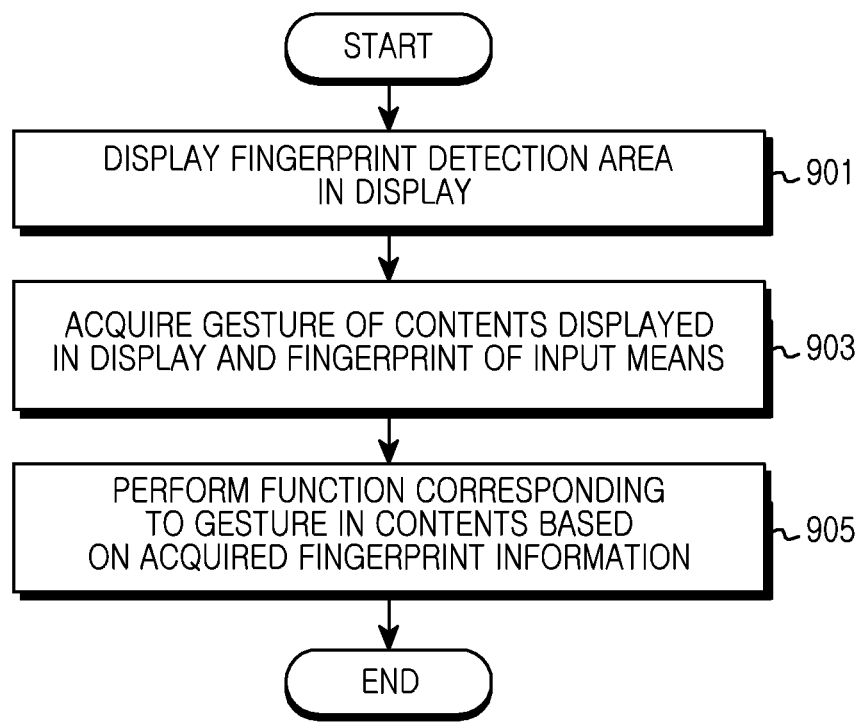
FIGS. 9A and 9B are flowcharts illustrating a method of processing fingerprint information in an electronic device according to an embodiment of the present invention.
Figure 9B:
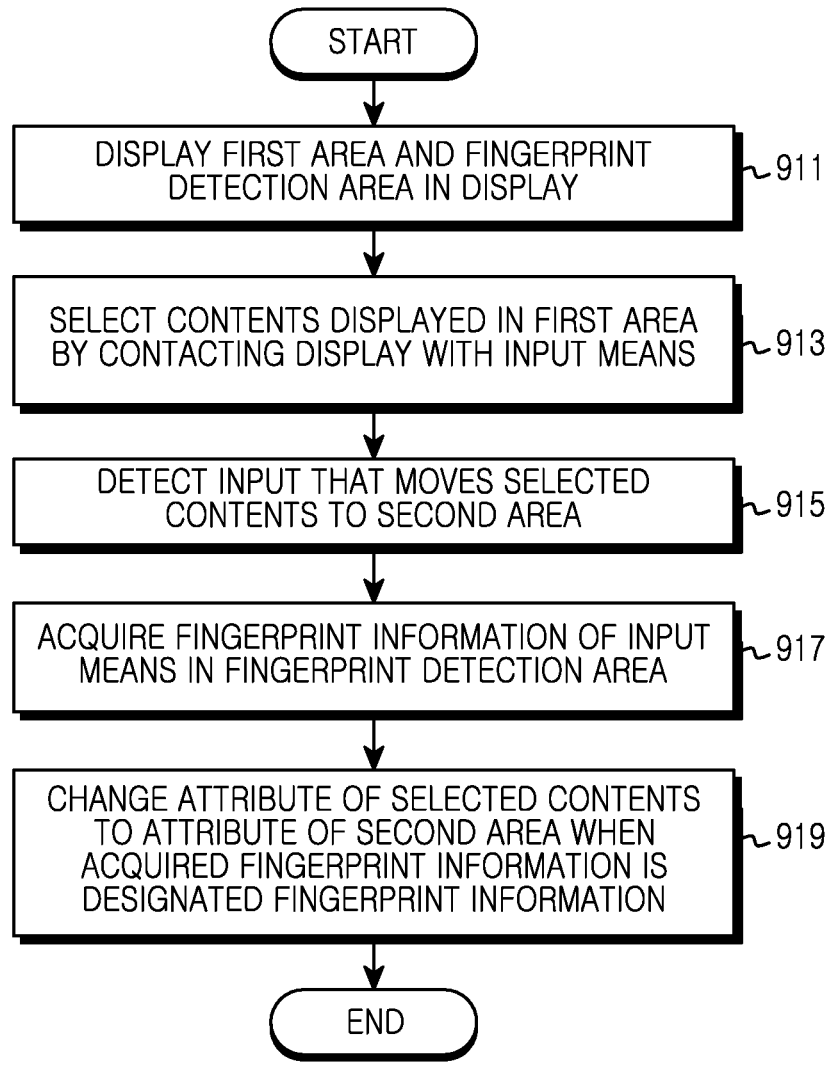

FIGS. 9A and 9B are flowcharts illustrating a method of processing fingerprint information in an electronic device 101 according to an embodiment of the present invention.

Hereinafter, an embodiment of the present invention is described with reference to FIG. 9A.

Referring to FIG. 9A, the electronic device 101 perform a designated operation of the electronic device 101 in selected contents using fingerprint information acquired in a fingerprint detecting area.

The electronic device 101 displays a fingerprint detecting area in the display 150 in step 901. The fingerprint detecting area displayed in the display 150 of the electronic device 101 is an area designated in the fingerprint detecting interface that can acquire fingerprint information of the input means to correspond to a designated area in which the input means contacts the display 150 by interacting with the display 150 formed with a touch screen. The electronic device 101 displays a designated area (e.g., fingerprint detecting area) set to acquire fingerprint information in the fingerprint detecting interface in the display 150.

The electronic device 101 acquires a gesture of contents displayed in the display 150 and fingerprint information of the input means in step 903. By selecting designated contents from at least one contents displayed in the display 150 and inputting a designated gesture in the display 150, the electronic device 101 applies a designated function such as movement, call, and change to the selected contents according to the selected gesture. When the input gesture requests designated fingerprint information, the electronic device 101 acquires fingerprint information of the input means via a fingerprint detecting area. According to an embodiment of the present invention, the electronic device 101 detects an operation of displaying contents of the first area selected by touching with the input means in a second area by crossing a fingerprint detecting area with a drag operation, and when displaying the selected contents in the second area, the electronic device 101 requests an input of designated fingerprint information. The electronic device 101 acquires fingerprint information of the input means crossing a fingerprint detecting area by a drag operation.

The electronic device 101 performs a function corresponding to the acquired gesture in contents, and when performing the function, if fingerprint information is requested, the electronic device 101 uses the acquired fingerprint information in step 905. According to an embodiment of the present invention, in order to perform a function corresponding to a gesture in the selected contents, the electronic device 101 requests an input of fingerprint information set to the contents or fingerprint information set to a corresponding function performing in the contents. The electronic device 101 compares fingerprint information acquired in the fingerprint detecting area with fingerprint information set to a corresponding function or the contents, and when the acquired fingerprint information corresponds with preset fingerprint information, the electronic device 101 perform a corresponding function in the selected contents.

After step 905 is performed, the electronic device 101 terminates the method of FIG. 9A.

Hereinafter, an embodiment of the present invention will be described with reference to FIG. 9B.

The electronic device 101 displays a designated first area and a designated fingerprint detecting area in the display 150 in step 911. When the display 150 is divided into at least two areas by the designated fingerprint detecting area, the electronic device 101 displays at least two areas of a first area and a second area.

By the input means contacting the display 150, the electronic device 101 selects contents displayed in the first area in step 913. Selected contents when the input means contacts the display 150 includes image data sound data, storage data included in at least one program included in the electronic device 101, data connected to at least one program included in the electronic device 101, and information about the above-described data.

The electronic device 101 detects an operation of displaying selected contents in the second area in step 915. An operation of displaying selected contents in the second area is an operation of dragging an input means while contacting the display 150 and includes an operation of overlapping at least a portion of the above-described contact area with a fingerprint detecting area. The operation is not limited to an operation of moving selected contents to a second area but may be an operation of moving selected contents to the outside of a first area and an operation of performing a function corresponding to a designated gesture in the selected contents.

In order to perform a function corresponding to a gesture in the selected contents, when preset fingerprint information is requested, the electronic device 101 acquires fingerprint information of the input means from a fingerprint detecting area in step 917. When at least a portion of a contact area is overlapped with a fingerprint detecting area or when a contact area crosses a fingerprint detecting area, the electronic device 101 acquires fingerprint information of the input means.

When performing a function of performing fingerprint information of the input means acquired in a fingerprint detecting area in the selected contents, if the acquired fingerprint information corresponds with requested fingerprint information, the electronic device 101 performs the corresponding function in the selected contents in step 919. According to an embodiment of the present invention, when fingerprint information input to correspond to requested fingerprint information corresponds with fingerprint information set to setting information of the electronic device 101, the electronic device 101 applies a function of the electronic device 101 designated to a gesture performed in contents selected in the display 150 or an attribute designated to an area (e.g., a second area) to which selected contents are moved.

After step 919 is performed, the electronic device 101 terminates the method of FIG. 9B.

Figure 10:
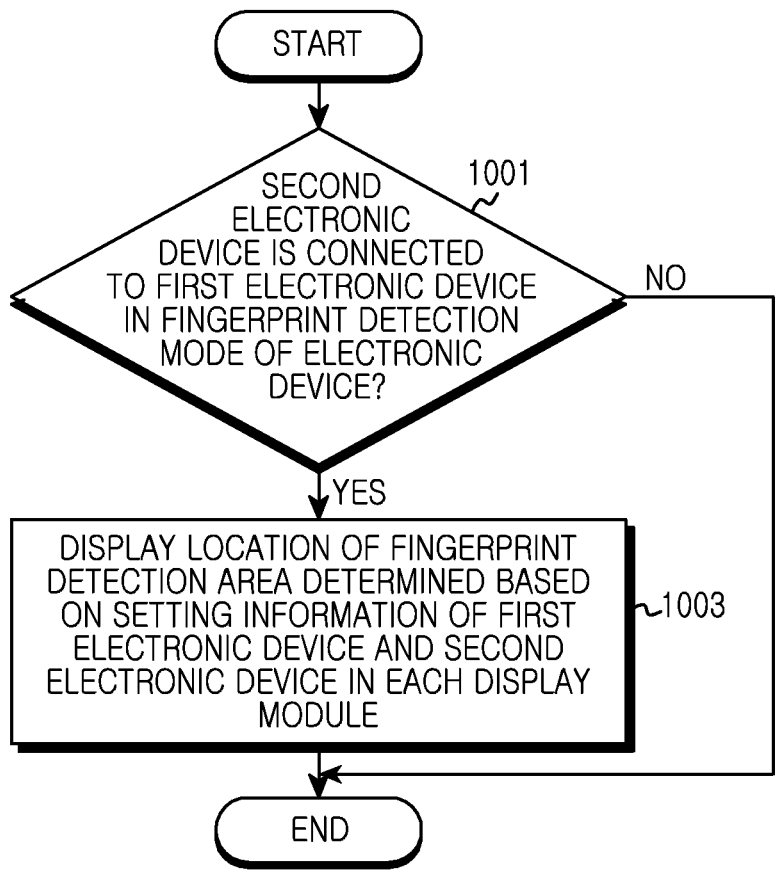
FIG. 10 is a flowchart illustrating a method of displaying a fingerprint detecting area in an electronic device according to an embodiment of the present invention.

FIG. 10 is a flowchart illustrating a method of displaying a fingerprint detecting area in the electronic device 101 according to an embodiment of the present invention.

The electronic device 101 determines whether the electronic device 101 is connected to at least one other electronic device (e.g., the second electronic device 102 or the third electronic device 103) by a network communication in a fingerprint detecting mode of the electronic device 101 in step 1001. If the electronic device 101 is connected to at least one other electronic device by the network communication, the electronic device 101 performs step 1003, and if the electronic device 101 is not connected to at least one other electronic device connected by the network communication, the electronic device 101 terminates the method of FIG. 10.

The electronic device 101 receives information about a display of the second electronic device 102 or information about a display of the third electronic device 103 from the second electronic device 102 or the third electronic device 103 connected by the network communication in step 1003. The electronic device 101 displays a fingerprint detecting area in a designated area of the display 150 of the electronic device 101 based on the received information of the second electronic device or the received information of the third electronic device and transmits information requesting display of a fingerprint detecting area at a designated location of the display of the second electronic device 102 or information requesting display of a fingerprint detecting area at a designated location of the display of the third electronic device 103 to the second electronic device 102 or the third electronic device 103. When setting a fingerprint detecting area to each of the other electronic devices connected by the network communication, the electronic device 101 determines to display a fingerprint detecting area in each display based on the received display information (e.g., information about a horizontal length and a vertical length of the display and a horizontal mode or a vertical mode) of the second electronic device 102 or display information (e.g., information about a horizontal length and a vertical length of the display and a horizontal mode or a vertical mode) of the third electronic device 103 and transmits the determined information to each electronic device.

After step 1003 is performed, the electronic device 101 terminates the method of FIG. 10.

According to an embodiment of the present invention, a method of operating an electronic device includes setting a fingerprint detecting area functionally connected to a display; and identifying a function corresponding to a gesture according to the gesture of an input means input to the display, wherein it is determined whether to perform the function with fingerprint information acquired in the fingerprint detecting area.

According to an embodiment, the gesture may include operation in which at least a portion of a contact area of the display and the input means enters or overlaps with the fingerprint detecting area or in which at least a portion of the contact area crosses the fingerprint detecting area.

According to an embodiment, the gesture may be performed by selecting contents of the display and dragging in a state of maintaining a contact with the display.

According to an embodiment, the function may include changing a first security attribute of contents selected by the gesture to a second security attribute of an area in which the drag is terminated.

According to an embodiment, the function may include setting or releasing a security attribute designated to selected contents to correspond to the gesture.

According to an embodiment, the designated security attribute may be set or released with the acquired fingerprint information.

According to an embodiment, the gesture may include copying contents displayed in a first area and displaying the contents in a second area.

According to an embodiment, the function may include including at least one of a security attribute, user information, and designated fingerprint information of the first area in the contents.

According to an embodiment, the function may set the contents displayed in the second area to an attribute of the second area.

According to an embodiment, the function may be performed, when the acquired fingerprint information corresponds with an authentication means of a security attribute set to the second area.

According to an embodiment, the fingerprint detecting area may be determined at a designated location of a boundary of the first area or a boundary of the second area.

According to an embodiment, the second area may be a designated area of a display of a second electronic device connected to the electronic device.

According to an embodiment, the function may include displaying a program designated to correspond to at least one fingerprint information in the second area.

According to an embodiment, when the input means is located in at least a portion of the fingerprint detecting area, the method may further include performing at least one of display of designated information in the display, a vibration of the electronic device in a designated pattern, and an output of a designated sound.

According to an embodiment, the method may further include displaying the preset fingerprint detecting area in the display.

According to an embodiment, the fingerprint information may be acquired while inputting the gesture.

According to an embodiment of the present invention, a method of operating a first electronic device includes determining at least one second electronic device connected to the first electronic device; determining a fingerprint detecting area in at least a partial area of a display of the first electronic device based on device related information received from the second electronic device; acquiring information about the second gesture of contacting with the input means at a designated location of a display of the second electronic device sequentially performed after the first gesture of an input means crosses the fingerprint detecting area by selecting contents displayed in the display of the first electronic device; and performing a function corresponding to the first gesture and the second gesture, wherein the fingerprint information of the input means is acquired in the fingerprint detecting area to determine whether to perform the function.

According to an embodiment of the present invention, a method of operating an electronic device includes receiving device related information of another electronic device and setting a fingerprint detecting area within a display; detecting a first gesture of crossing the fingerprint detecting area and receiving a second gesture of crossing a display of the another electronic device sequentially performed after the first gesture from the another electronic device; and performing a function corresponding to the first gesture and the second gesture according to fingerprint information detected in a process of crossing the fingerprint detecting area.

According to an embodiments, the function may transmit contents displayed in the display based on the first gesture and the second gesture to the another electronic device.

According to an embodiment, the function may include including designated information of the electronic device in the transmitting contents.

According to an embodiment of the present invention, a method of operating an electronic device includes receiving device related information of another electronic device and setting a fingerprint detecting area within a display; receiving a first gesture of crossing a display of the another electronic device from the another electronic device and detecting a second gesture of crossing the fingerprint detecting area sequentially performed after the first gesture; and performing a function corresponding to the first gesture and the second gesture according to fingerprint information detected in a process of crossing the fingerprint detecting area.

Figure 11:
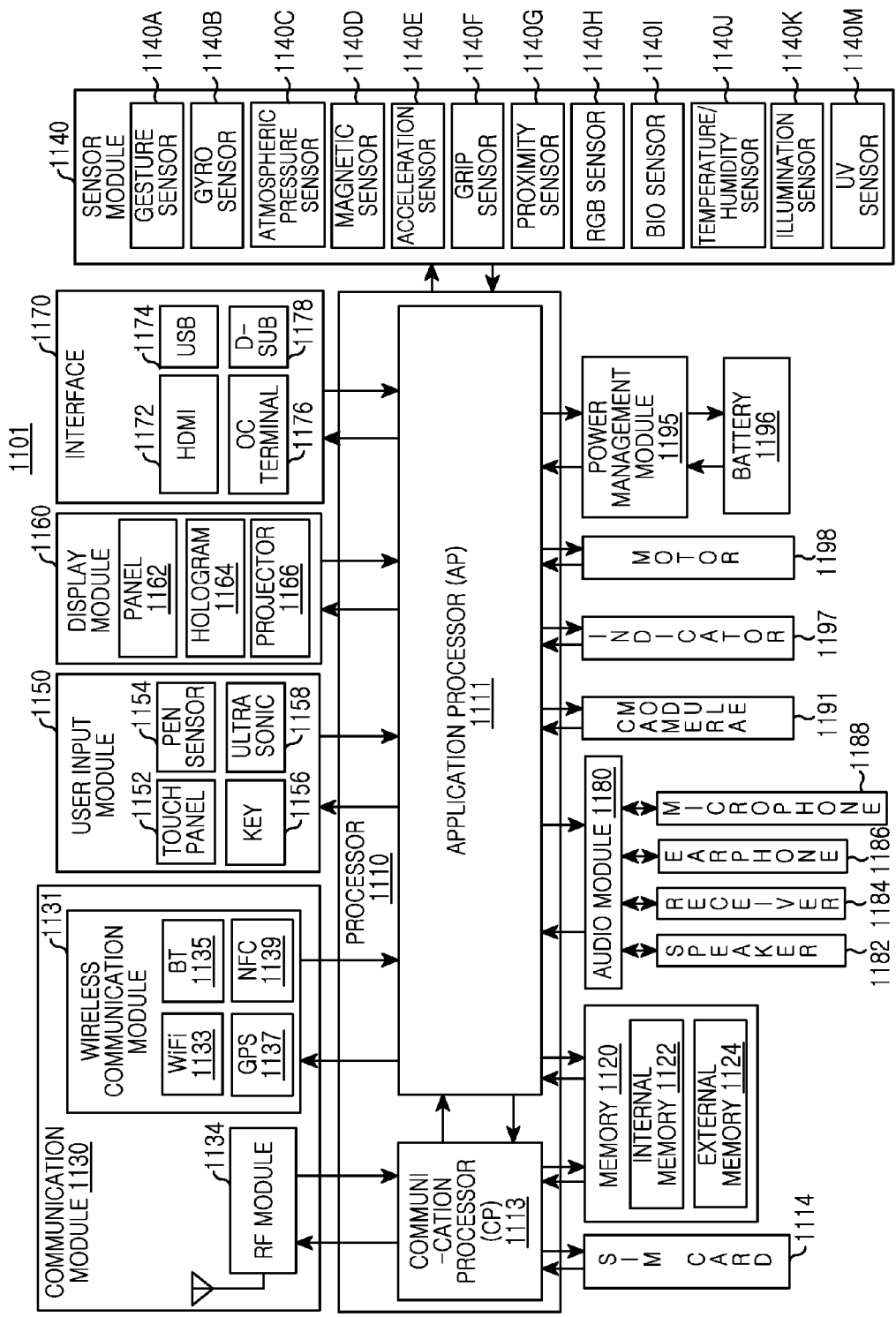
FIG. 11 is a block diagram illustrating a configuration of an electronic device according to an embodiment of the present invention.

FIG. 11 is a block diagram illustrating a configuration of an electronic device 1101 according to an embodiment of the present invention.

The electronic device 1101 may be, for example, the entire or a portion of the electronic device 101 of FIG. 1.

Referring to FIG. 11, the electronic device 1101 includes at least one processor 1110, a Subscriber Identity Module (SIM) card 1114, a memory 1120, a communication module 1130, a sensor module 1140, a user input module 1150, a display module 1160, an interface 1170, an audio module 1180, a camera module 1191, a power management module 1195, a battery 1196, an indicator 1197, and a motor 1198.

The processor 1110 (e.g., the processor 120) includes at least one Application Processor (AP) 1111 or at least one Communication Processor (CP) 1113. In FIG. 11, the AP 1111 and the CP 1113 may be included within the processor 1110, but the AP 1111 and the CP 1113 may be included within different Integrated Circuit (IC) packages, respectively. In an embodiment of the present invention, the AP 1111 and the CP 1113 may be included within an IC package.

The AP 1111 drives an operating system or an application program to control a plurality of hardware or software components connected to the AP 1111 and performs various data processing and operations including multimedia data. The AP 1111 may be implemented with, for example, a System on Chip (SoC). According to an embodiment of the present invention, the processor 1110 may further include a Graphics Processing Unit (GPU).

The CP 1113 manages a data link in a communication between the electronic device 1101 (e.g., the electronic device 101) and other electronic devices (e.g., the electronic device 102, the electronic device 104, or the server 164) connected by a network and a function of converting a communication protocol. The CP 1113 may be implemented with, for example, an SoC. According to an embodiment of the present invention, the CP 1113 performs at least a portion of a multimedia control function. The CP 1113 performs identification and authentication of the electronic device within a communication network using, fix example, a Subscriber Identification Module (e.g., the SIM card 1114). Further, the CP 1113 provides services such as audio dedicated communication, audiovisual communication, a text message, or packet data to a user.

Further, the CP 1113 controls data transmission and reception of the communication module 1130. In FIG. 11, elements of the CP 1113, the power management module 1195, or the memory 1120 are elements separate from the AP 1111, but according to an embodiment of the present invention, the AP 1111 may include at least a portion (e.g., the CP 1113) of the foregoing elements.

According to an embodiment of the present invention, the AP 1111 or the CP 1113 loads and processes an instruction or data received from at least one of the other elements or a non-volatile memory connected to each of the AP 1111 and the CF 1113 in a volatile memory. Further, the AP 1111 or the CF 1113 stores data received from at least one of the other elements or generated by at least one of the other elements in a non-volatile memory.

The SIM card 1114 is a card including a subscriber identification module and is inserted into a slot formed at a location of the electronic device 1101. For example, the SIM card 1114 includes intrinsic identification information (e.g., Integrated Circuit Card Identifier (ICCID)) or subscriber information (e.g., International Mobile Subscriber Identity (IMSI)).

The memory 1120 (e.g., the memory 130) includes an internal memory 1122 or an external memory 1124. The internal memory 1122 includes at least one of a volatile memory (e.g., a Dynamic Random Access Memory (DRAM), a Static RAM (SRAM), a Synchronous Dynamic RAM (SDRAM)), or a non-volatile memory (e.g., a One-Time Programmable Read Only Memory (OTFROM), a Programmable ROM (PROM), an Erasable and Programmable ROM (EPROM), an Electrically Erasable and Programmable ROM (EEPROM), a mask ROM, a flash ROM, a NAND flash memory, and a NOR flash memory). According to an embodiment of the present invention, the internal memory 1122 may be a Solid State Drive (SSD). The external memory 1124 includes a flash drive, for example, a Compact Flash (CF) drive, a Secure Digital (SD) card, a Micro-SD card, a Mini-SD, extreme Digital (xD) card, or a memory stick. The external memory 1124 is functionally connected to the electronic device 1101 via various interfaces. According to an embodiment of the present invention, the electronic device 1101 further includes a storage device (or storage medium) such as a hard drive.

The communication module 1130 (e.g., the communication interface 160) includes a wireless communication module 1131 or a Radio Frequency (RF) module 1134. The wireless communication module 1131 includes, for example, Wireless Fidelity (WiFi) 1133, Bluetooth (BT) 1135, Global Positioning System (GPS) 1137, or Near Field Communication (NFC) 1139. For example, the wireless communication module 1131 provides a wireless communication function using a radio frequency. Additionally or alternatively, the wireless communication module 1131 includes a network interface (e.g., a LAN card) or a modem for connecting the electronic device 1101 to a network (e.g., the Internet, a LAN, a WAN, a telecommunication network, a cellular network, a satellite network or a POTS).

The RF module 1134 performs transmission and reception of data, for example, transmission and reception of an RF signal. The RF module 1134 includes, for example, a transceiver, a Power Amplifier Module (PAM), a frequency filter, or a Low Noise Amplifier (LNA). Further, the RF module 1134 further includes a component, for example, a conductor or a conductive wire that transmits and receives electromagnetic waves in free space in a wireless communication.

The sensor module 1140 measures a physical quantity or detects an operation state of the electronic device 1101 and converts measured or detected information to an electrical signal. The sensor module 1140 includes at least one of, for example, a gesture sensor 1140A, a gyro sensor 1140B, an atmospheric pressure sensor 1140C, a magnetic sensor 1140D, an acceleration sensor 1140E, a grip sensor 1140F, a proximity sensor 1140G, a color sensor 1140H (e.g., a Red Green Blue (RGB) sensor), a biometric or bio sensor 1140I, a temperature/humidity sensor 1140J, an illumination sensor 1140K, an Ultra Violet (UV) light sensor 1140M. Additionally or alternatively, the sensor module 1140 further includes, for example, an Electronic Nose (E-nose) sensor, an ElectroMyoGram (EMG) sensor, an ElectroEncephaloGram (EEG) sensor, an ElectroCardioGram (ECG) sensor, an InfraRed (IR) sensor, an iris sensor, or a fingerprint sensor. The sensor module 1140 further includes a control circuit that controls at least one sensor included in the sensor module 1140.

The user input module 1150 includes a touch panel 1152, a (digital) pen sensor 1154, a key 1156, or an ultrasonic wave input device 1158. The touch panel 1152 recognizes a touch input with at least one method of, for example, a capacitive, resistive, infrared ray, or ultrasonic wave method. Further, the touch panel 1152 further includes a control circuit. When the touch panel 1152 is a capacitive type touch panel, the touch panel 1152 performs a physical contact or proximity recognition. The touch panel 1152 further includes a tactile layer. In this case, the touch panel 1152 provides a haptic reaction to the user.

The (digital) pen sensor 1154 may be implemented using the same method as and a method similar to, for example, reception of a touch input of the user or a separate recognition sheet. The key 1156 includes, for example, a physical button, an optical key, a keypad, or a touch key. The ultrasonic wave input device 1158 determines data by detecting a sound wave with a microphone (e.g., a microphone 1188) in the electronic device 1101 via an input means that generates an ultrasonic wave signal and performs wireless recognition. According to an embodiment of the present invention, the electronic device 1101 receives a user input from an external device (e.g., a network, a computer, or a server) connected to the communication module 1130 using the communication module 1130.

The display module 1160 (e.g., the display 150) includes a panel 1162, a hologram device 1164, or a projector 1166. The panel 1162 may be, for example, a Liquid Crystal Display (LCD) or Active Matrix Organic Light Emitting Diodes (AM-OLED). The panel 1162 may be implemented with, for example, a flexible, transparent, or wearable method. The panel 1162 and the touch panel 1152 may be formed in a module. The hologram device 1164 displays a stereoscopic image in the air using the interference of light. The projector 1166 projects light onto a screen to display an image. The screen may be located, for example, internally or externally to the electronic device 1101. According to an embodiment of the present invention, the display module 1160 further includes a control circuit that controls the panel 1162, the hologram device 1164, or the projector 1166.

The interface 1170 includes, for example, a High Definition Multimedia Interface (HDMI) 1172, a Universal Serial Bus (USB) 1174, an Optical Communication terminal (OC terminal) 1176, or a D-subminiature (D-sub) connector 1178. The interface 1170 may be included in, for example, the communication interface 160 of FIG. 1. Additionally or alternatively, the interface 1170 of FIG. 11 may include, for example, a Mobile High-Definition (MHL) link, a Secure Digital/Multimedia Card (SD/MMC) or an Infrared Data Association (IrDA) interface.

The audio module 1180 interactively converts sound and an electrical signal. At least a partial constituent element of the audio module 1180 may be included in, for example, the input and output interface 140 of FIG. 1. The audio module 1180 of FIG. 11 processes sound information input or output via, for example, a speaker 1182, a receiver 1184, an earphone 1186, or a microphone 1188.

The camera module 1191 photographs a still picture and a moving picture, and, according to an embodiment of the present invention, the camera module 1191 includes at least one image sensor (e.g., a front surface lens or a rear surface lens), a lens, an Image Signal Processor (ISP), or a flash (e.g., a Light Emitting Diode (LED) or a xenon lamp).

The power management module 1195 manages power of the electronic device 1101. The power management module 1195 includes, for example, a Power Management Integrated Circuit (PMIC), a charge IC, a battery, or a battery gauge.

The PMIC may be mounted within, for example, an IC or an SoC semiconductor. A charging method may be classified into a wired method and a wireless method. The charge IC charges a battery and prevents an overvoltage or an overcurrent from being ejected from a charger. According to an embodiment of the present invention, the charge IC includes a charge IC for at least one of a wired charge method and a wireless charge method. The wireless charge method include, for example, a magnetic resonance method, a magnetic induction method, or an electromagnetic wave method and may add an additional circuit, for example, a circuit such as a coil loop, a resonance circuit, and a rectifier for wireless charging.

The battery gauge measures, for example, a residual quantity of the battery 1196, a voltage, a current, or a temperature while charging. The battery 1196 stores or generates electricity and supplies power to the electronic device 1101 using stored or generated electricity. The battery 1196 includes, for example, a rechargeable battery or a solar cell.

The indicator 1197 displays a state, for example, a booting state, a message state, a charge state of the electronic device 1101, or a portion (e.g., the AP 1111) thereof. The motor 1198 converts an electrical signal to a mechanical vibration. The electronic device 1101 may include a processing device (e.g., a Graphics Processing Unit (GPU)) for supporting a mobile TV. The processing device for supporting the mobile TV processes media data according to a specification of for example, Digital Multimedia Broadcasting (DMB), Digital Video Broadcasting (DVB), or media flow.

The foregoing constituent elements of an electronic device according to an embodiment of the present invention may each be formed with at least one component, and a name of a corresponding constituent element may be changed according to a type of the electronic device. The electronic device according to an embodiment of the present invention may include at least one of the foregoing elements, may omit some elements, or may further include additional elements. Further, as some of the elements of an electronic device according to an embodiment of the present invention are coupled to for an entity, the entity may equally perform a function of corresponding elements before coupling.

By designating at least a partial area of the fingerprint detecting interface and using a partial area as a fingerprint detecting area, the electronic device can provide a user interface and a function that can interact with various fingerprint input methods or fingerprint input of a user, where power consumed in the electronic device can be reduced.

An embodiment of the present invention may be performed by at least one of at least one program in which a memory of the electronic device 101 includes, at least one processor (e.g., the processor 120), and the fingerprint processing module 170.

According to an embodiment of the present invention, at least a portion of a device and a method according to an embodiment of the present invention described in the appended claims and/or specification of the present invention may be implemented in a form (e.g., a module) including hardware, software, firmware, or at least a combination of two of hardware, software, and firmware. A module may be a minimum unit or a portion thereof that performs an embodiment of the present invention as a minimum unit of an integrally formed component or a portion thereof. The "module" may be mechanically or electronically implemented. When implementing with software, a non-transitory computer readable storage medium that stores at least one program (or a programming module) may be provided. For example, software may be implemented with an instruction stored in a non-transitory computer readable storage medium in a form of a programming module. At least one program may include an instruction that enables the electronic device to execute methods according to an embodiment of the present invention described in the appended claims and/or specification of the present invention. When the instruction is executed by at least one processor (e.g., the processor 120), the at least one processor performs a function corresponding to the instruction. The non-transitory computer readable storage media may be, for example, the memory 130. At least a portion of the programming module may be implemented (e.g., executed) by, for example, the processor 120. At least a portion of the programming module includes, for example, a module, a program, a routine, a set of instructions, or a process for performing at least one function.

The non-transitory computer readable storage media includes magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and a hardware device, an Electrically Erasable and Programmable Read Only Memory (EEPROM), a magnetic disk storage device, or optical storage devices of other forms, and a magnetic cassette, specially formed to store and perform a program instruction (e.g., a programming module), such as a Read Only Memory (ROM), a Random Access Memory (RAM), and a flash memory. Alternatively, the program may be stored in a memory formed with a combination of a portion or the entirety thereof. Further, each constituent memory may be included in plural.

Further, the program may be stored in an attachable storage device that may access the electronic device via a communication network such as the Internet, an Intranet, a LAN, a Wireless LAN (WLAN), a Storage Area Network (SAN), or a communication network formed with a combination thereof. Such a storage device may access the electronic device via an external port. Further, a separate storage device on the communication network may access a portable electronic device. In order to perform an operation of an embodiment of the present invention, the above-described hardware device may be formed to operate as at least one software module, and vice versa.

A module or a programming module according to an embodiment of the present invention may include at least one of the foregoing constituent elements, may omit some constituent elements, or may further include additional other constituent elements. Operations performed by a module, a programming module, or another constituent element according to an embodiment of the present invention may be executed with a sequential, parallel, repeated, or heuristic method. Further, some operations may be executed in different orders, may be omitted, or may add other operations.

While the present invention has been shown and described with reference to embodiments thereof, it will be understood by those skilled in the art that various changes in form and details may be made therein without departing from the scope and spirit of the present invention, as defined by the appended claims and their equivalents.

What is claimed is:

1. A method of operating an electronic device, the method comprising:
    displaying a screen comprising a first region containing an icon of an application program and a second region distinguished from the first region;
    detecting a touch input for moving the icon from the first region across a third region to the second region; and
    displaying the screen in which the icon is moved to the second region,
    wherein a security attribute of the application program is changed in response to moving the icon to the second region, and
    wherein the method further comprises:
    obtaining, via the third region, fingerprint information from the touch input.

2. The method of claim 1, wherein detecting the touch input comprises:
    dragging the icon in the first region corresponding to a first attribute to the second region corresponding to a second attribute while maintaining contact with the display,
    wherein the second attribute comprises a security attribute requiring fingerprint authentication for executing applications of the second region.

3. The method of claim 2, further comprising changing the first attribute of the application program into the second attribute if the touch input is terminated in the second region.

4. The method of claim 2, further comprising releasing the security attribute designated to the application program if the icon is moved back to the first region.

5. The method of claim 1, wherein the display comprises a touch screen and a plurality of fingerprint sensors overlapped with the touch screen.

6. The method of claim 1, wherein obtaining the fingerprint information comprises:
    enabling at least one fingerprint sensor corresponding to the third region; and
    disabling at least another fingerprint sensor corresponding to a remaining region other than the third region of the display.

7. The method of claim 1, further comprising changing the third region according to another input,
    wherein the another input comprises at least one of:
    moving an object in the third region of the display to another region;
    moving the third region; or
    changing a size of the third region.

8. The method of claim 1, further comprising communicating with at least another electronic device, and
    wherein the third region is determined based on information of the at least another electronic device.

9. The method of claim 8, wherein the information of the at least another electronic device comprises a size of the at least another electronic device or a position of the at least another electronic device.

10. An electronic device, comprising:
    a display configured to display at least one content;
    at least one processor operatively coupled to the display; and
    a memory operatively coupled to the at least one processor and configured to store data,
    wherein the at least one processor is configured to:
    control the display to display a screen comprising a first region containing an icon of an application program and a second region distinguished from the first region;
    detect a touch input for moving the icon from the first region across a third region to the second region; and
    control the display to display the screen in which the icon is moved to the second region,
    wherein a security attribute of the application program is changed in response to moving the icon to the second region, and
    wherein the at least one processor is further configured to obtain, via the third region, fingerprint information from the touch input.

11. The electronic device of claim 10, wherein the at least one processor is configured to drag the icon in the first region corresponding to a first attribute to the second region corresponding to a second attribute while maintaining contact with the display,
    wherein the second attribute comprises a security attribute requiring fingerprint authentication for executing applications of the second region.

12. The electronic device of claim 11, wherein the at least one processor is further configured to change the first attribute of the application program into the second attribute if the touch input is terminated in the second region.

13. The electronic device of claim 11, wherein the at least one processor is further configured to release the security attribute designated to the application program if the icon is moved back to the first region.

14. The electronic device of claim 10, wherein the display comprises a touch screen and a plurality of fingerprint sensors overlapped with the touch screen.

15. The electronic device of claim 10, wherein the at least one processor is configured to:

enable at least one fingerprint sensor corresponding to the third region; and disable at least another fingerprint sensor corresponding to a remaining region other than the third region of the display.

16. The electronic device of claim 10, wherein the at least one processor is further configured to change the third region according to another input, wherein the another input comprises at least one of:
moving an object in the third region of the display to another region;
moving the third region; and
changing a size of the third region.

17. The electronic device of claim 10, wherein the electronic device is configured to communicate with at least another electronic device, and wherein the third region is determined based on information of the at least another electronic device.

18. The electronic device of claim 17, wherein the information of the at least another electronic device comprises a size of the at least another electronic device or a position of the at least another electronic device.

* * * * *